(12) United States Patent
He et al.

(10) Patent No.: US 11,403,353 B2
(45) Date of Patent: Aug. 2, 2022

(54) INFORMATION SENDING METHOD, APPARATUS, AND STORAGE MEDIUM

(71) Applicant: TENCENT TECHNOLOGY (SHENZHEN) COMPANY LIMITED, Shenzhen (CN)

(72) Inventors: Xu He, Shenzhen (CN); Xiwang Yang, Shenzhen (CN); Gong Chen, Shenzhen (CN); Chong Peng, Shenzhen (CN); Yuanfeng Song, Shenzhen (CN); Shi Huang, Shenzhen (CN); Bifeng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 840 days.

(21) Appl. No.: 16/221,166

(22) Filed: Dec. 14, 2018

(65) Prior Publication Data

US 2019/0121828 A1    Apr. 25, 2019

Related U.S. Application Data

(63) Continuation of application No. PCT/CN2017/097320, filed on Aug. 14, 2017.

(30) Foreign Application Priority Data

Sep. 27, 2016 (CN) .......................... 201610857303.4

(51) Int. Cl.
*G06F 16/20* (2019.01)
*G06F 16/90* (2019.01)
(Continued)

(52) U.S. Cl.
CPC .... *G06F 16/9535* (2019.01); *G06F 16/24568* (2019.01); *G06F 16/951* (2019.01); *G06F 17/10* (2013.01); *G06Q 30/0245* (2013.01)

(58) Field of Classification Search
CPC ....................... G06F 16/9535; G06F 16/24568
See application file for complete search history.

(56) References Cited

U.S. PATENT DOCUMENTS

| | | | | |
|---|---|---|---|---|
| 10,915,929 B1* | 2/2021 | Huang | ............. | H04N 21/47211 |
| 2013/0325584 A1* | 12/2013 | Bogaty | ............. | G06Q 30/0242 |
| | | | | 705/14.41 |
| 2017/0178181 A1* | 6/2017 | Liu | .................... | G06Q 30/0275 |

FOREIGN PATENT DOCUMENTS

| | | |
|---|---|---|
| CN | 105117491 A | 12/2015 |
| CN | 105183856 A | 12/2015 |

(Continued)

OTHER PUBLICATIONS

International Search Report dated Oct. 27, 2017 for PCT/CN2017/097320, 2 pages.

*Primary Examiner* — Kristopher Andersen
(74) *Attorney, Agent, or Firm* — ArentFox Schiff LLP

(57) ABSTRACT

Embodiments of this application provide a method of distributing information from an allocator terminal to a client terminal over a communication network. Information allocation data in an information allocation system is collected by processing circuitry. The information allocation system is configured to allocate the information to a client terminal. The information allocation data includes data associated with a process of allocating the information. Data of actual effect and estimated effect of allocating the information is calculated according to the information allocation data. An allocation instruction is generated according to a comparison between the actual effect data and the corresponding estimated effect data. The allocation instruction is provided to the allocator terminal.

19 Claims, 15 Drawing Sheets

(51) Int. Cl.
*G06F 17/10* (2006.01)
*G06Q 30/02* (2012.01)
*G06F 16/9535* (2019.01)
*G06F 16/951* (2019.01)
*G06F 16/2455* (2019.01)

(56) References Cited

FOREIGN PATENT DOCUMENTS

| | | |
|---|---|---|
| CN | 105320766 A | 2/2016 |
| CN | 105871940 A | 8/2016 |
| CN | 106548364 A | 3/2017 |

\* cited by examiner

INFORMATION SENDING METHOD, APPARATUS, AND STORAGE MEDIUM

RELATED APPLICATION

This application is a continuation of International Application No. PCT/CN2017/097320, filed on Aug. 14, 2017, which claims priority to Chinese Patent Application No. 201610857303.4, entitled "INFORMATION SENDING METHOD AND APPARATUS" filed on Sep. 27, 2016. The entire disclosures of the prior applications are hereby incorporated by reference in their entirety.

FIELD OF THE TECHNOLOGY

Embodiments of this application relate to the field of Internet technologies.

BACKGROUND OF THE DISCLOSURE

With development of communication technologies, more content (including text, pictures, audio, videos, and the like) is distributed to various users from information providers through various communication networks. For example, an information allocation system can be employed for distribution of information from a source terminal to multiple client terminals. The source terminal may be configured to transmit to-be-distributed information and distribution parameters to the information allocation system. The information allocation system can be configured to allocate the to-be-distributed information to the multiple client terminals according to the distribution parameters. The source terminal and the client terminals may communicate with the information allocation system via various communication networks.

SUMMARY

Embodiments of this application provide a method of distributing information from an allocator terminal to a client terminal over a communication network. Information allocation data from an information allocation system is received by processing circuitry. The information allocation system is configured to allocate the information from the allocator terminal to the client terminal through the communication network (e.g., the Internet). First data indicating an actual allocation effect of the information is calculated by the processing circuitry according to the information allocation data. Second data indicating an estimated allocation effect of the information is calculated by the processing. An allocation instruction is generated by the processing circuitry according to a comparison between the first data and the corresponding second data. The allocation instruction is transmitted to the allocator terminal. The information allocation data includes data associated with a process of allocating the information. In this way, the allocation instruction provided to the allocator terminal can adapt to an allocation environment that changes in real time, which helps an allocator of the information to adjust the allocation process and improve the allocation effect.

Embodiments of this application provide an apparatus for distributing information from an allocator terminal to a client terminal over a communication network. The apparatus includes processing circuitry. The processing circuitry is configured to receive information allocation data from an information allocation system. The information allocation system is configured to allocate the information from the allocator terminal to the client terminal. The information allocation data includes data associated with a process of allocating the information. The processing circuitry is further configured to calculate first data according to the information allocation data. The first data indicates an actual allocation effect. The processing circuitry is further configured to calculate second data according to the information allocation data. The second data indicates an estimated allocation effect of the information. The processing circuitry is further configured to generate an allocation instruction according to a comparison between the first data and the corresponding second data. The allocation instruction is transmitted to the allocator terminal.

Embodiments of this application further provide a non-transitory computer-readable medium storing a program executable by a processor to perform the method of distributing the information from the allocator terminal to the client terminal over the communication network.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

To make the objectives, technical solutions, and advantages of this application clearer, the following further describes in detail implementations of this application with reference to the accompanying drawings.

First, some terms described in the embodiments of this application are explained as follows:

An information recommendation system (also referred to as an information allocation system) is a platform used for allocating recommendation information to a target user client in a targeted manner. The target user client is a client on which an account of a target user is used for login. The recommendation information may be information having recommendation value, such as multimedia information, or advisory information.

An allocator is a user or an organization allocating recommendation information in an information recommendation system. When the recommendation information is advertisement information, the allocator is an advertiser.

Real-time allocation data is data associated with an allocation process of the recommendation information.

Actual effect data is used for representing an actual allocation effect of the recommendation information in the information recommendation system. The actual effect data may include at least one of the number of actual searches, the number of actual impressions, an actual click-through rate, and actual costs. A number of impressions of recommendation information refers, for example, to the number of times the recommendation information has been displayed or exposed to viewers.

Estimated effect data is used for representing an estimated allocation effect of the recommendation information in the information recommendation system. Estimated effect data corresponding to the number of actual searches is a current estimated number of searches. Estimated effect data corresponding to the number of actual impressions is a current estimated number of impressions. Estimated effect data corresponding to the actual click-through rate is a current estimated click-through rate. Estimated effect data corresponding to the actual costs is current estimated costs.

Figure 1:
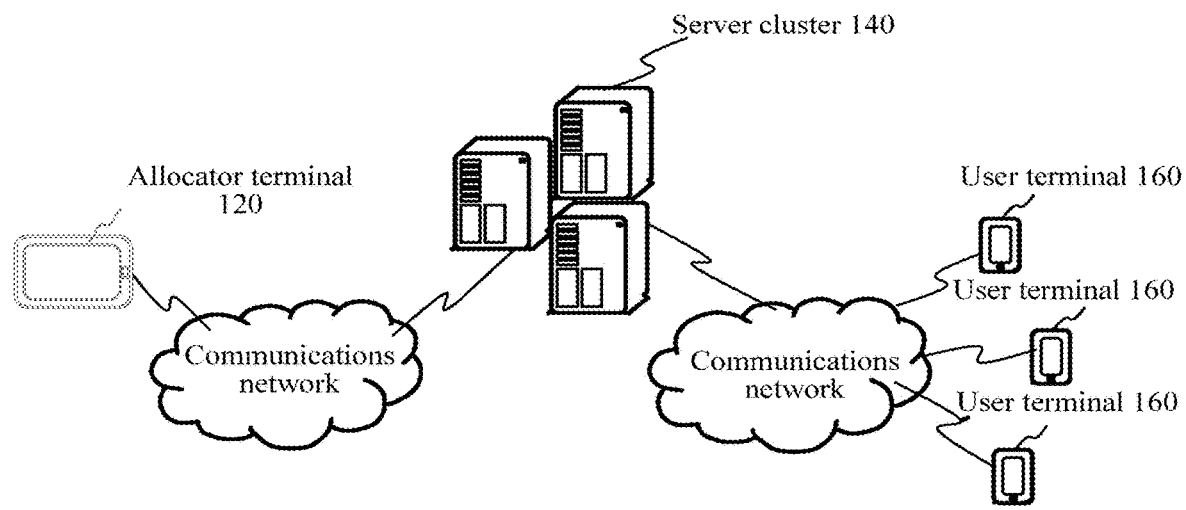
FIG. 1 is a schematic structural diagram of an information sending system according to an embodiment of this application.

Referring to FIG. 1, FIG. 1 is a schematic structural diagram of an information sending system described in an embodiment of this application. The system includes an allocator terminal 120, a server cluster 140, and at least one user terminal 160.

An allocator client runs on the allocator terminal 120. The allocator terminal 120 may be a mobile phone, a tablet computer, an e-book reader, a moving picture experts group audio layer III (MP3) player, a moving picture experts group audio layer IV (MP4) player, a portable laptop computer, a desktop computer, or the like. The allocator client is a software client for allocating recommendation information in an information recommendation system.

The allocator terminal 120 and the server cluster 140 are connected to each other by using a communications network. The communications network may be a wired network or a wireless network.

The server cluster 140 is one server, or includes several servers, or is a virtualization platform, or is a cloud computing service center. The server cluster 140 may include a server for implementing an information recommendation system.

The server cluster 140 and the user terminal 160 are connected to each other by using a communications network. The communications network may be a wired network or a wireless network.

A standard communications technology and/or protocol is used for the wireless network or the wired network described above. The network is usually the Internet, but may be any network, including but not limited to any combination of a local area network (LAN), a metropolitan area network (MAN), a wide area network (WAN), a mobile, wired or wireless network, a dedicated network, or a virtual private network (VPN). In some embodiments, data that is exchanged by using a network is represented by using a technology and/or a format including the Hypertext Markup Language (HTML), the Extensible Markup Language (XML), or the like. In addition, all or some links may be encrypted by using an encryption technology such as Secure Sockets Layer (SSL), Transport Layer Security (TLS), a VPN, Internet Protocol Security (IPsec). In some other embodiments, customized and/or dedicated data communication technology may further be used to replace or supplement the foregoing data communication technology.

A user client runs on the user terminal 160, and a user account is used for login on the user client. The user terminal 160 may be a mobile phone, a tablet computer, an e-book reader, an MP3 player, an MP4 player, a portable laptop computer, a desktop computer, or the like.

Generally, the allocator terminal 120 allocates recommendation information to the server cluster 140, and then the server cluster 140 sends the recommendation information to the user terminal 160 on which the user client is located.

It should be noted that the user client may be a social media application client, for example, a microblog client, a WeChat client by Tencent Holdings Limited of China, or a Yixin client by Alibaba Group Holding Limited of China. Alternatively, the user client may be a payment application client, for example, an Alipay client by Alibaba Group Holding Limited of China. Alternatively, the user client may be another client, such as a shopping client, a game client, a reading client, or a client specially used for sending recommendation information.

Figure 2:
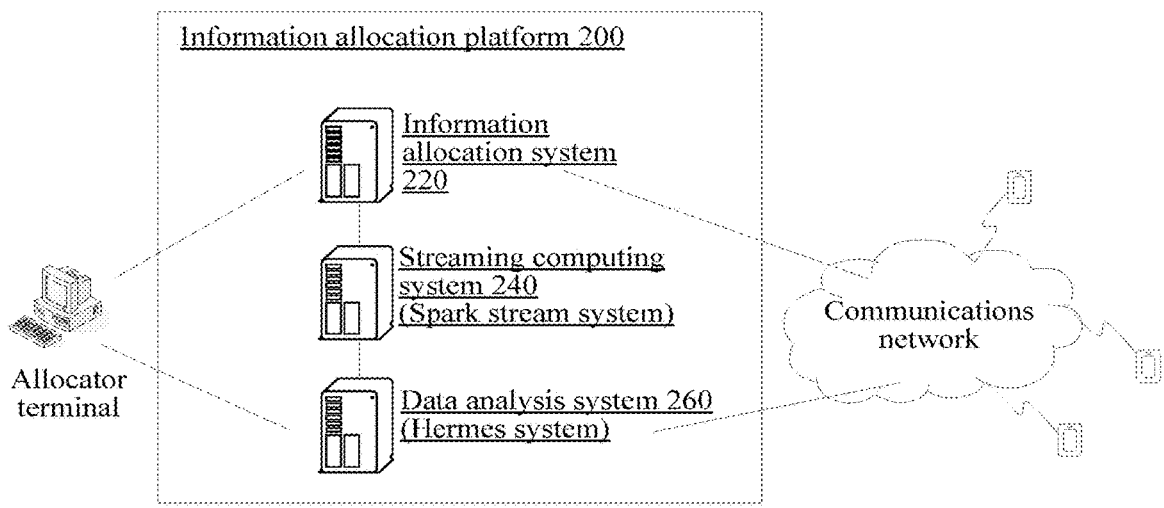
FIG. 2 is a schematic architectural diagram of an information recommendation system according to an embodiment of this application.

Referring to FIG. 2, FIG. 2 is a schematic architectural diagram of an information recommendation platform (also referred to as an information allocation plat form) 200 according to another embodiment of this application. The information recommendation platform 200 includes: an information recommendation system 220, a streaming computing system 240, and a data analysis system 260.

The information recommendation system 220 is configured to receive an allocation request of an allocator terminal. The allocation request is used for allocating recommendation information. The recommendation information is allocated to a target user client. The target user client may be a client determined based on a targeted label set by the allocator terminal. Exemplarily, the information recommendation system 220 is an advertisement system. Because the information recommendation system 220 allocates same or different recommendation information to many user clients, the information recommendation system 220 continuously generates a lot of streaming data. Streaming data has features such as timeliness, volatility, burstiness, randomness and infinity.

The streaming computing system 240 is configured to: collect in real time streaming data of the recommendation information in the information recommendation system 220, and perform structured processing on the streaming data, to obtain real-time allocation data of the recommendation information. The structured processing is a processing manner of converting streaming data collected in real time into data with a structured storage form. The real-time allocation data is data associated with an allocation process of the recommendation information. Exemplarily, the streaming computing system 240 is any one of a Spark streaming system, a Storm streaming system or a Samza streaming system.

The data analysis system 260 is configured to: acquire the real-time allocation data of the recommendation information at predetermined time intervals; and perform calculation according to the real-time allocation data each time the real-time allocation data is acquired, and generate allocation recommendation information (also referred to as an allocation instruction) according to the recommendation information. Exemplarily, the data analysis system 260 is a Hermes real-time retrieval and analysis system.

It may be understood that after receiving the allocation recommendation information sent by the data analysis system, an allocator client adjusts the allocation process of the recommendation information according to the allocation recommendation information. Therefore, after the adjustment, allocation data generated in the allocation process is different from the previously collected real-time allocation data. In other words, after the allocation process is adjusted, the allocation data changes, and an allocation effect is improved. Continuous adjustments in the allocation process gradually improve the allocation effect.

It may be understood that the server cluster 140 may include a server used for implementing the information recommendation system 220, and certainly, may also include a server used for implementing the streaming computing system 240 and a server used for implementing the data analysis system 260. Alternatively, the server used for implementing the information recommendation system 220 may also be used for implementing the streaming computing system 240 and/or the data analysis system 260.

Figure 3:
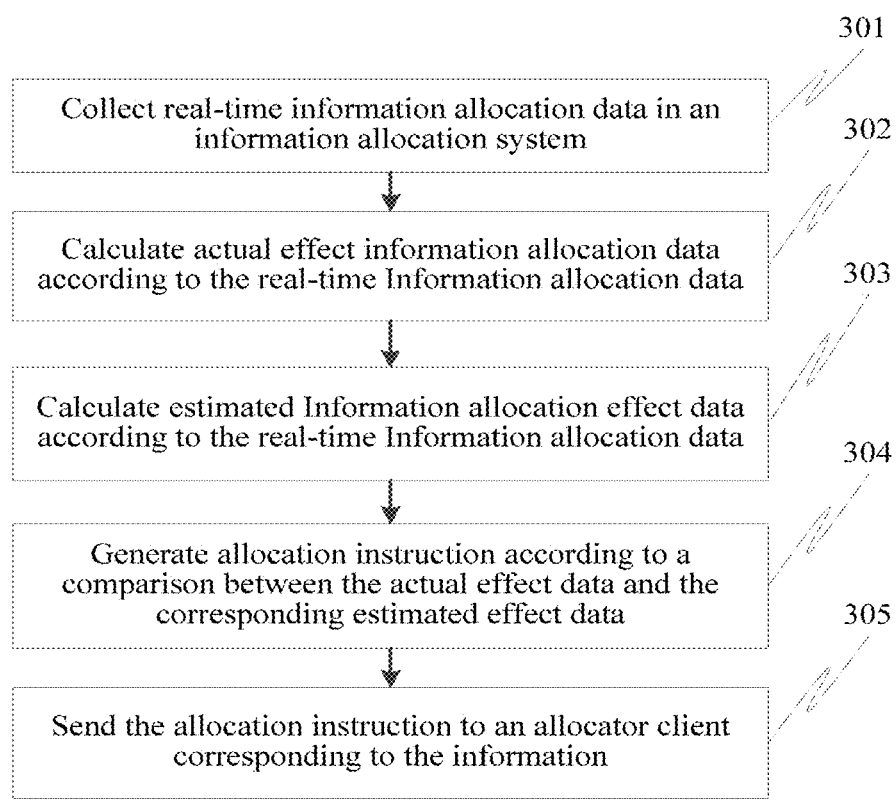
FIG. 3 is a flowchart of an information sending method according to an embodiment of this application.

Referring to FIG. 3, FIG. 3 is a flowchart of an information sending method according to an embodiment of this application. This embodiment is described by using an example in which the information sending method is applied to the server cluster 140 shown in FIG. 1. The information sending method includes the following steps:

Step 301. Collect real-time allocation data of recommendation information in an information recommendation system.

The recommendation information is information having recommendation value, such as advertisement information, multimedia information, or advisory information.

The real-time allocation data is data associated with an allocation process of the recommendation information. The real-time allocation data may include: element content of the recommendation information, an allocation budget for the recommendation information within a unit time period (for example, one day), a single bid when the recommendation information is successfully allocated, a targeted label of the recommendation information, the number of searches of the recommendation information, the number of impressions of the recommendation information, the number of clicks, and the number of conversions.

Step 302. Calculate actual effect data of the recommendation information according to the real-time allocation data of the recommendation information.

Step 303. Calculate estimated effect data of the recommendation information according to the real-time allocation data of the recommendation information.

Step 304. Generate allocation recommendation information according to a comparison result between the actual effect data and the corresponding estimated effect data.

Step 305. Send the allocation recommendation information to an allocator client corresponding to the recommendation information.

In conclusion, actual effect data of recommendation information and estimated effect data of the recommendation information are calculated according to real-time allocation data of the recommendation information, and allocation recommendation information is generated according to a comparison result between the actual effect data and the corresponding estimated effect data. This resolves a problem that allocation recommendation information generated when recommendation information is created cannot adapt to an allocation environment changing in real time. In addition, the corresponding allocation recommendation information is sent to an allocator according to a comparison result between actual effect data and estimated effect data in an advertisement allocation process, so that an allocation effect of the recommendation information is monitored in real time in the allocation process, thereby achieving an effect of making the allocation recommendation information adapt to the allocation environment changing in real time.

Figure 4A:
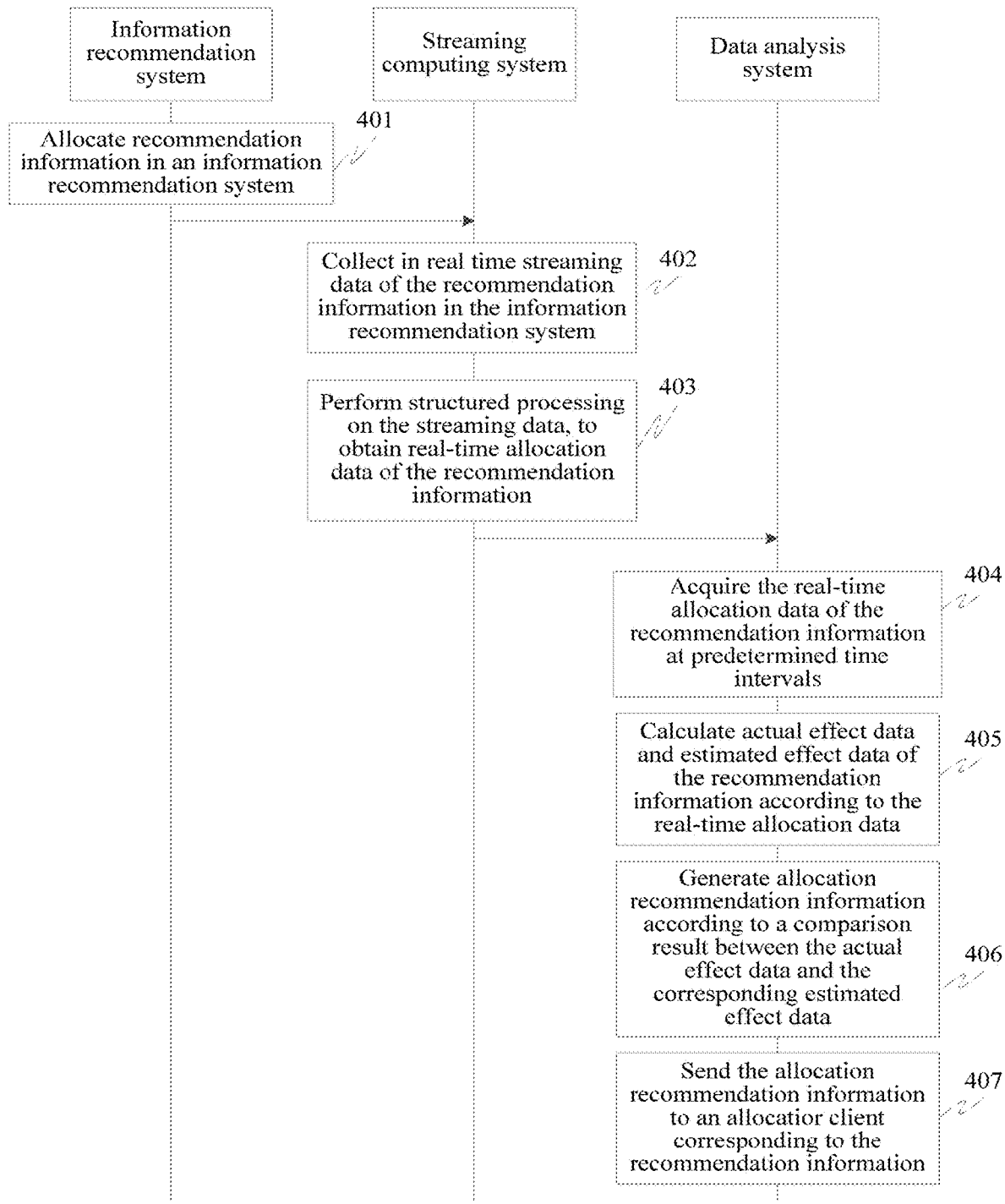
FIG. 4a is a flowchart of an information sending method according to another embodiment of this application.

Referring to FIG. 4a, FIG. 4a is a flowchart of an information sending method according to another embodiment of this application. This embodiment is described by using an example in which the information sending method is applied to the information recommendation platform 200 shown in FIG. 2. The information sending method further includes the following steps:

Step 401. An allocator client allocates recommendation information in an information recommendation system.

The allocator client sends an allocation request to the information recommendation system.

The allocation request may include: element content of the recommendation information, an allocation budget for the recommendation information within a unit time period, a single bid when the recommendation information is successfully allocated, a targeted label of the recommendation information, and the like.

The element content of the recommendation information includes at least one of text, a picture, audio, and a video.

The allocation budget for the recommendation information within a unit time period is: a one-hour expenditure budget of the recommendation information, a one-day expenditure budget of the recommendation information, a one-week expenditure budget of the recommendation information, a one-month expenditure budget of the recommendation information, or a one-year expenditure budget of the recommendation information. In this embodiment, the one-day expenditure budget of the recommendation information is used as an example for description, and is referred to as a "daily budget" for short.

Bidding refers to a price at which recommendation information is successfully exposed, clicked, or converted for one time.

The targeted label of the recommendation information is a label used for determining a target user group, for example, age, gender, educational background, location, hobby, a type of used terminal, and a type of an operating system of the used terminal.

The information recommendation system receives the allocation request sent by the allocator client. The information recommendation system determines a target user group according to the targeted label, and sends the recommendation information to target user clients used by the target user group.

Because the information recommendation system usually continuously operates 24 hours a day, the information recommendation system continuously generates real-time allocation data related to the recommendation information, that is, streaming data.

Step 402. A streaming computing system collects in real time streaming data of the recommendation information in the information recommendation system.

Because streaming data has features of timeliness, burstiness, and randomness, the streaming computing system collects in real time the streaming data of the recommendation information in the information recommendation system.

Step 403. The streaming computing system performs structured processing on the streaming data, to obtain real-time allocation data of the recommendation information.

The structured processing is a processing manner of converting streaming data collected in real time into data with a structured storage form.

Data in a structured storage form is data stored and fixed in a predetermined format. The data in the structured storage form can be used and analyzed by a data analysis system.

Step 404. A data analysis system acquires the real-time allocation data of the recommendation information at predetermined time intervals.

The data analysis system may be but is not limited to a Hermes analysis system.

The predetermined time interval may be set to thirty minutes, one hour, or two hours. Duration of the predetermined time interval is not limited in this embodiment of this application.

Step 405. The data analysis system calculates actual effect data and estimated effect data of the recommendation information according to the real-time allocation data each time acquiring the real-time allocation data.

The actual effect data may include at least one of the number of actual searches, the number of actual impressions, an actual click-through rate, and actual costs.

The number of actual searches is the number of searches of a key word corresponding to the recommendation information on a search engine of the information recommendation system. The number of actual impressions is the number of impressions of the recommendation information on the target user clients. The actual click-through rate is the number of clicks of the recommendation information after exposure on the target user clients. The actual costs are a relationship between conversion data of the recommendation information and a total expenditure amount. The conversion data is the number of pieces of effective behavior data obtained through conversion after the recommendation information is allocated. The effective behavior data includes at least one of adding-to-favorites behavior data, registration behavior data, downloading behavior data, and payment behavior data. The total expenditure amount is an amount of total expenditure of the recommendation information, for example, a total amount of expenditure on allocation of an advertisement by an advertiser.

Estimated effect data corresponding to the number of actual searches is a current estimated number of searches. Estimated effect data corresponding to the number of actual impressions is a current estimated number of impressions. Estimated effect data corresponding to the actual click-through rate is a current estimated click-through rate. Estimated effect data corresponding to the actual costs is current estimated costs.

Step 406. The data analysis system generates allocation recommendation information according to a comparison result between the actual effect data and the corresponding estimated effect data.

The data analysis system may detect whether the actual effect data is consistent with the estimated effect data; and if the actual effect data is consistent with the estimated effect data, continue to perform monitoring; or if the actual effect data is inconsistent with the estimated effect data, the data analysis system generates allocation recommendation information.

Step 407. The data analysis system sends the allocation recommendation information to an allocator client corresponding to the recommendation information, allocation data generated according to the allocation recommendation information being different from the collected real-time allocation data.

It should be noted that step 404 to step 407 are steps to be performed iteratively at predetermined time intervals.

In conclusion, a data analysis system calculates actual effect data and estimated effect data of recommendation information according to real-time allocation data, and generates allocation recommendation information according to a comparison result between the actual effect data and the corresponding estimated effect data. This resolves a problem that allocation recommendation information generated when a new advertisement is created cannot adapt to an advertisement allocation environment changing in real time. In addition, the corresponding allocation recommendation information is sent to an allocator according to a comparison result between actual effect data and estimated effect data in an advertisement allocation process, so that an advertisement allocation effect is monitored in real time, thereby achieving an effect of making the allocation recommendation information of the new advertisement adapt to the advertisement allocation environment changing in real time.

Figure 4B:
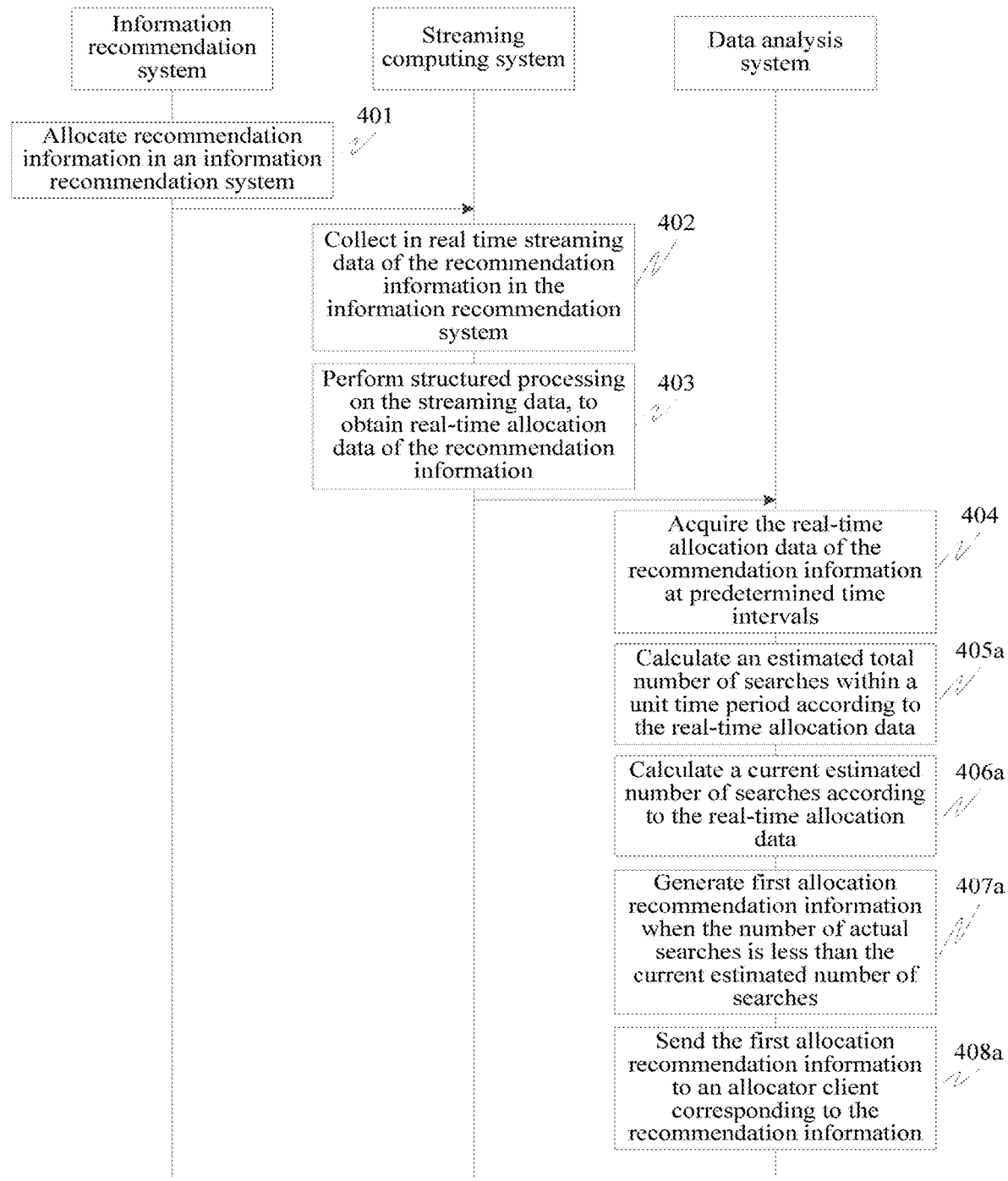
FIG. 4b is a flowchart of an information sending method according to another embodiment of this application.

In an embodiment based on FIG. 4a, when the actual effect data includes the number of actual searches, and estimated effect data includes the current estimated number of searches, step 405 to step 407 are alternatively implemented as step 405a to step 408a, as shown in FIG. 4b:

Step 405a. Calculate an estimated total number of searches within a unit time period according to the real-time allocation data.

The estimated total number of searches within the unit time period is calculated by using the following formula:

$$\text{the estimated total number of searches within the unit time period} = a * \text{an estimated total number of impressions within the unit time period};$$

$$\text{the estimated total number of impressions within the unit time period} = \frac{\text{day\_budget}}{\text{bid\_price} * ctr} * r, \text{ and } ctr = \max(ctr1, ctr2)$$

"a" is an empirical value, and because the estimated total number of searches within the unit time period greater than or equal to the estimated total number of impressions within the unit time period, a value of "a" is usually greater than or equal to 1. Exemplarily, "a" is 1. It may be understood that as a preset constant, "a" is usually greater than or equal to 1, but does not need to be greater than or equal to 1.

day_budget is an expenditure budget for allocating the recommendation information within the unit time period. The unit time period may be set to one hour, one day, one week, one month, or one year. Exemplarily, descriptions are provided below all by using an example in which the unit time period is one day.

bid_price is a single bid for allocating the recommendation information. The single bid may be a price offered each time the recommendation information is exposed, or may be a price offered each time the recommendation information clicked, or may be a piece each time the recommendation information is viewed by one thousand persons. Exemplarily, the single bid may be a price offered each time the recommendation information is clicked.

ctr1 is a historical average click-through rate of the recommendation information in an industry of the recommendation information. ctr2 is a historical average click-through rate of the recommendation information in a targeted demographic.

Historical data used by ctr1 and ctr2 may be historical data of the last hour, historical data of last six hours, data of last 12 hours, historical data of a same day last week, historical data of a same day last month, historical data of a same day last year, or the like.

r is an adjustment value. The information recommendation system usually uses a two-level pricing mode. To be specific, when multiple users contend to offer a price, a user offering the highest price obtains impression permission, but the information recommendation system uses the second highest prices as a final offered price for calculation. Therefore, an actual offered price of the recommendation information in the information recommendation system is less than the single bid, and a value of an estimated number of impressions obtained through calculation according to the foregoing formula is less than a value of an actual estimated number of impressions. A value of r is usually greater than 1. Exemplarily, r is 1.2. It may be understood that as a preset constant, r is usually greater than or equal to 1, but does not need to be greater than or equal to 1.

The estimated total number of searches within the unit time period (for example, one day) is an estimated total number of searches of the key word corresponding to the recommendation information on the search engine of the information recommendation system.

The estimated total number of impressions within the unit time period (for example, one day) is an estimated total number of impressions of the recommendation information on the target user client.

The expenditure budget for allocating the recommendation information within the unit time period, the single bid for the recommendation information, the historical average click-through rate of the recommendation information in the industry of the recommendation information, and the historical average click-through rate of the recommendation information in the targeted demographic belong to real-time allocation data.

Step 406a. Calculate a current estimated number of searches according to the real-time allocation data.

The current estimated number of searches is calculated by using the following formula:

$$\text{the current estimated number of searches} = \frac{\int_{t_{start}}^{t_{curr}} c(t)\,dt}{\int_{t_{start}}^{t_{end}} c(t)\,dt} \times \text{the estimated total number of searches within the unit time period}$$

c(t) is a search opportunity curve, the search opportunity curve is a relationship curve between the number of available searches within the unit time period (for example, one day) and moments, and the search opportunity curve may be calculated according to historical search data in the information recommendation system. The search opportunity curve may be a search opportunity curve of a previous day, a search opportunity curve of a same day last week, a search opportunity curve of a same day last month, a search opportunity curve of a same day last year, or the like.

[t_start, t_curr] is an allocation start moment to a current allocation moment of the recommendation information within the unit time period (for example, one day). For example, if allocation of the recommendation information starts at 10:00 every day, an allocation starting time is 10:00; and if a current time is 10:30, a current allocation time is "10:30".

[t_start, t_end] is the allocation start moment to an allocation end moment of the recommendation information within the unit time period (for example, one day). For example, if allocation of the recommendation information starts at 10:00 every day, and ends at 23:00, an allocation starting time is 10:00, and an allocation end time is "23:00".

When the allocation time of the recommendation information within the unit time period (one day) is discontinuous, an integral function is discontinuous in an integral interval of [t_start, t_curr] and [t_start, t_end] in the foregoing formula, and the integral function in the foregoing formula is converted into a time-segmented integral sum function.

The foregoing search opportunity curve, and the allocation start moment, the current allocation moment and the allocation end moment of the recommendation information within the unit time period belong to real-time allocation data.

Step 407a. Generate first allocation recommendation information when the number of actual searches is less than the current estimated number of searches.

Exemplarily, when the number of actual searches is less than the current estimated number of searches, a targeted label of the recommendation information may not be accurate. The data analysis system generates first allocation recommendation information, the first allocation recommendation information being used for recommending that allocation targeting of the recommendation information is modified.

When the number of actual searches is greater than the current estimated number of searches, the data analysis system continues to perform step 404.

Step 408a. Send the first allocation recommendation information to an allocator client corresponding to the recommendation information.

In conclusion, a data analysis system compares, at predetermined time intervals, the number of actual searches with a current estimated number of searches, and generates first allocation recommendation information when the number of actual searches is less than the current estimated number of searches, so that an allocator can find as soon as possible that a targeted label of the recommendation information is not accurately set, and adjust the targeted label of the recommendation information in a timely manner, thereby ensuring an allocation effect of the recommendation information.

Figure 4C:
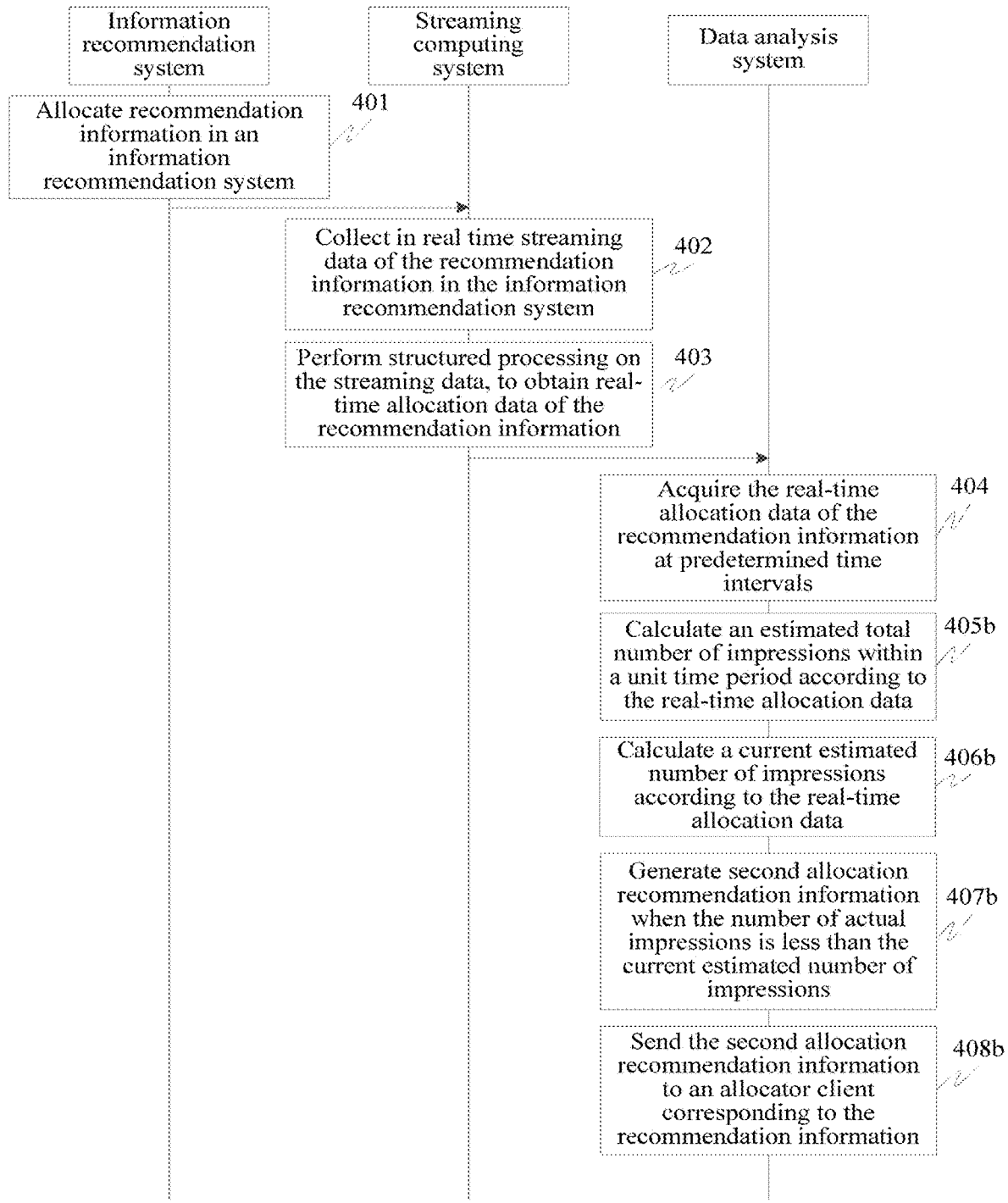
FIG. 4c is a flowchart of an information sending method according to another embodiment of this application.

In another embodiment based on FIG. 4a, when actual effect data includes the number of actual impressions, and estimated effect data includes a current estimated number of impressions, step 405 to step 407 are alternatively implemented as step 405b to step 408b, as shown in FIG. 4c:

Step 405b. Calculate an estimated total number of impressions within a unit time period according to the real-time allocation data.

The estimated total number of impressions within the unit time period is calculated by using the following formulas:

$$\text{the estimated total number of impressions within the unit time period} = \frac{\text{day\_budget}}{\text{bid\_price} * ctr} * r, \text{ and } ctr = \max(ctr1, ctr2)$$

For explanations of the parameters: the estimated total number of impressions within the unit time period, day_budget, bid_price, ctr1, ctr2, and r, refer to detailed descriptions in the embodiment shown in FIG. 4a. Details are not described herein again.

Step 406b. Calculate a current estimated number of impressions according to the real-time allocation data.

The current estimated number of impressions is calculated by using the following formula:

$$\text{the current estimated number of impressions} = \frac{\int_{t_{start}}^{t_{curr}} d(t) dt}{\int_{t_{start}}^{t_{end}} d(t) dt} \times \text{the estimated total number of impressions within the unit time period}$$

d(t) is an impression opportunity curve, the impression opportunity curve is a relationship curve between the number of impressions within the unit time period (one day) and moments, and the impression opportunity curve may be calculated according to historical impression data in the information recommendation system. The impression opportunity curve may be an impression opportunity curve of a previous day, an impression opportunity curve of a same day last week, an impression opportunity curve of a same day last month, an impression opportunity curve of a same day last year, or the like.

[t_start, t_curr] is an allocation start moment to a current allocation moment of the recommendation information within the unit time period (for example, one day). For example, if allocation of the recommendation information starts at 10:00 every day, an allocation starting time is 10:00; and if a current time is 10:30, a current allocation time is "10:30".

[t_start, t_end] is the allocation start moment to an allocation end moment of the recommendation information within the unit time period (for example, one day). For example, if allocation of the recommendation information starts at 10:00 every day, and ends at 23:00, an allocation starting time is 10:00, and an allocation end time is "23:00".

When the allocation time of the recommendation information within the unit time period (one day) is discontinuous, an integral function is discontinuous in an integral interval of [t_start, t_curr] and [t_start, t_end] in the foregoing formula, and the integral function in the foregoing formula is converted into a time-segmented integral sum function.

The foregoing impression opportunity curve, and the allocation start moment, the current allocation moment and the allocation end moment of the recommendation information within the unit time period belong to real-time allocation data.

Step 407b. Generate second allocation recommendation information when the number of actual impressions is less than the current estimated number of impressions.

Exemplarily, the second allocation recommendation information is used for recommending that an element of the recommendation information is modified and/or a single bid of the recommendation information is increased.

Exemplarily, when the number of actual impressions is less than the current estimated number of impressions, the element of the recommendation information may be poor in quality and/or the single bid of the recommendation information may be low. The data analysis system generates second allocation recommendation information, the second allocation recommendation information being used for recommending that an element of the recommendation information is modified and/or a single bid of the recommendation information is increased. When the number of actual impressions is greater than the current estimated number of impressions, the data analysis system continues to perform step 404.

Step 408b. Send the second allocation recommendation information to an allocator client corresponding to the recommendation information.

In conclusion, a data analysis system compares, at predetermined time intervals, the number of actual impressions with a current estimated number of impressions, and generates second allocation recommendation information when the number of actual impressions is less than the current estimated number of impressions, so that an allocator can find as soon as possible that a targeted label of the recommendation information is not accurately set, and adjust the targeted label of the recommendation information in a timely manner, thereby ensuring an allocation effect of the recommendation information.

Figure 4D:
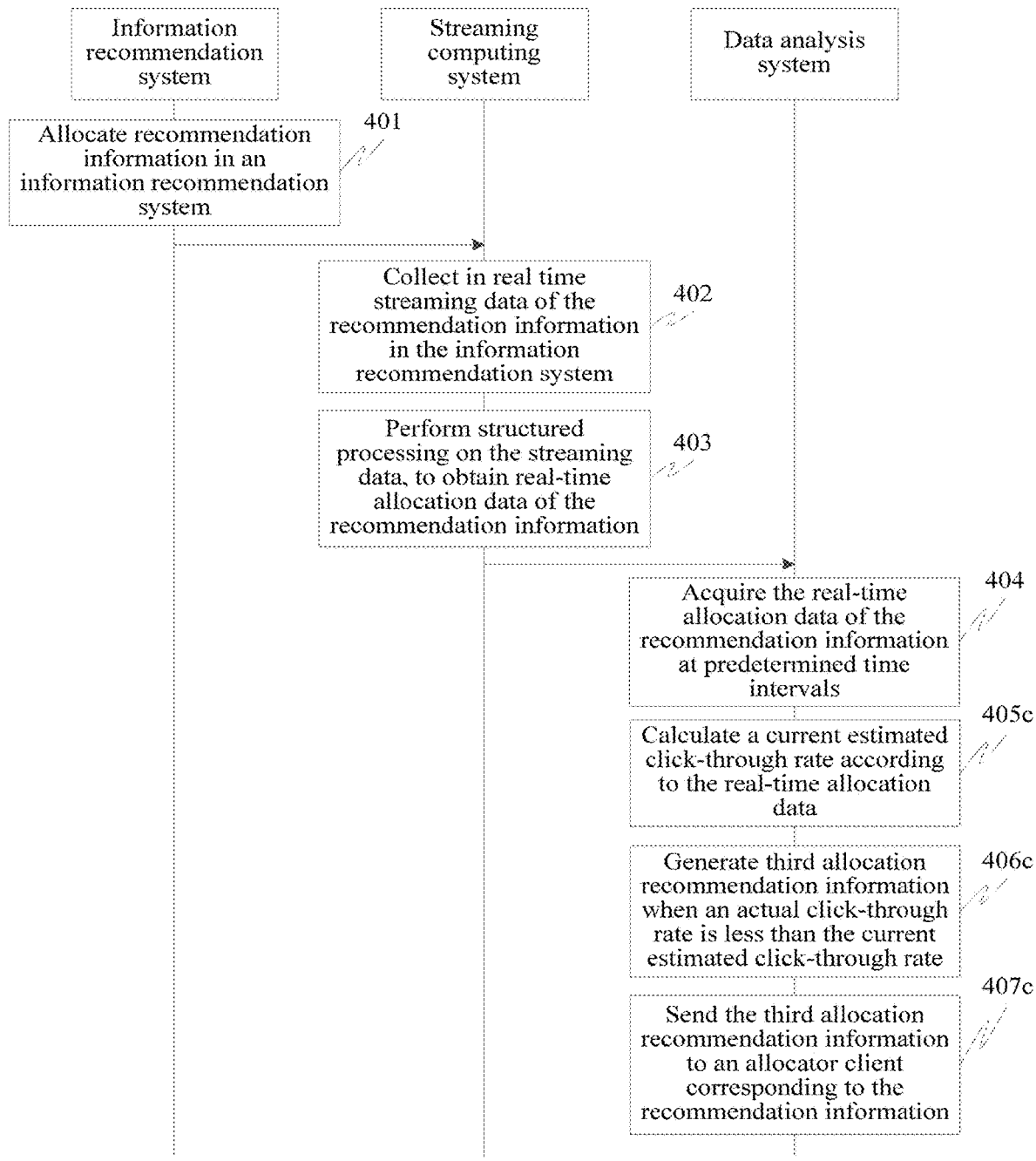
FIG. 4d is a flowchart of an information sending method according to another embodiment of this application.

In another embodiment based on FIG. 4a, when actual effect data is an actual click-through rate, and estimated effect data is a current estimated click-through rate, step 405 to step 407 are alternatively implemented as step 405c to step 407c, as shown in FIG. 4d:

Step 405c. Calculate a current estimated click-through rate according to the real-time allocation data.

The current estimated click-through rate is calculated by using the following formula:

$$\text{the current estimated click-through rate} = \min(ctr1, ctr2)$$

For explanations of the two parameters ctr1 and ctr2, refer to the detailed descriptions in the embodiment shown in FIG. 4b. Details are not described herein again.

Step 406c. Generate third allocation recommendation information when the actual click-through rate is less than the current estimated click-through rate.

Exemplarily, when the actual click-through rate is less than the current estimated click-through rate, the element of the recommendation information may be poor in quality and/or the targeted label of the recommendation information may be inaccurate. The data analysis system generates third allocation recommendation information, the third allocation recommendation information being used for recommending that the element of the recommendation information is modified and/or allocation targeting of the recommendation information is modified. When the actual click-through rate is greater than the current estimated click-through rate, the data analysis system continues to perform step 404.

Step 407c. Send the third allocation recommendation information to an allocator client corresponding to the recommendation information.

In conclusion, a data analysis system compares, at predetermined time intervals, an actual click-through rate with a current estimated click-through rate, and generates third allocation recommendation information when the actual click-through rate is less than the current estimated click-through rate, so that an allocator can find as soon as possible that a targeted label of the recommendation information is not accurately set, and adjust the targeted label of the recommendation information in a timely manner, thereby ensuring an allocation effect of the recommendation information.

Figure 4E:
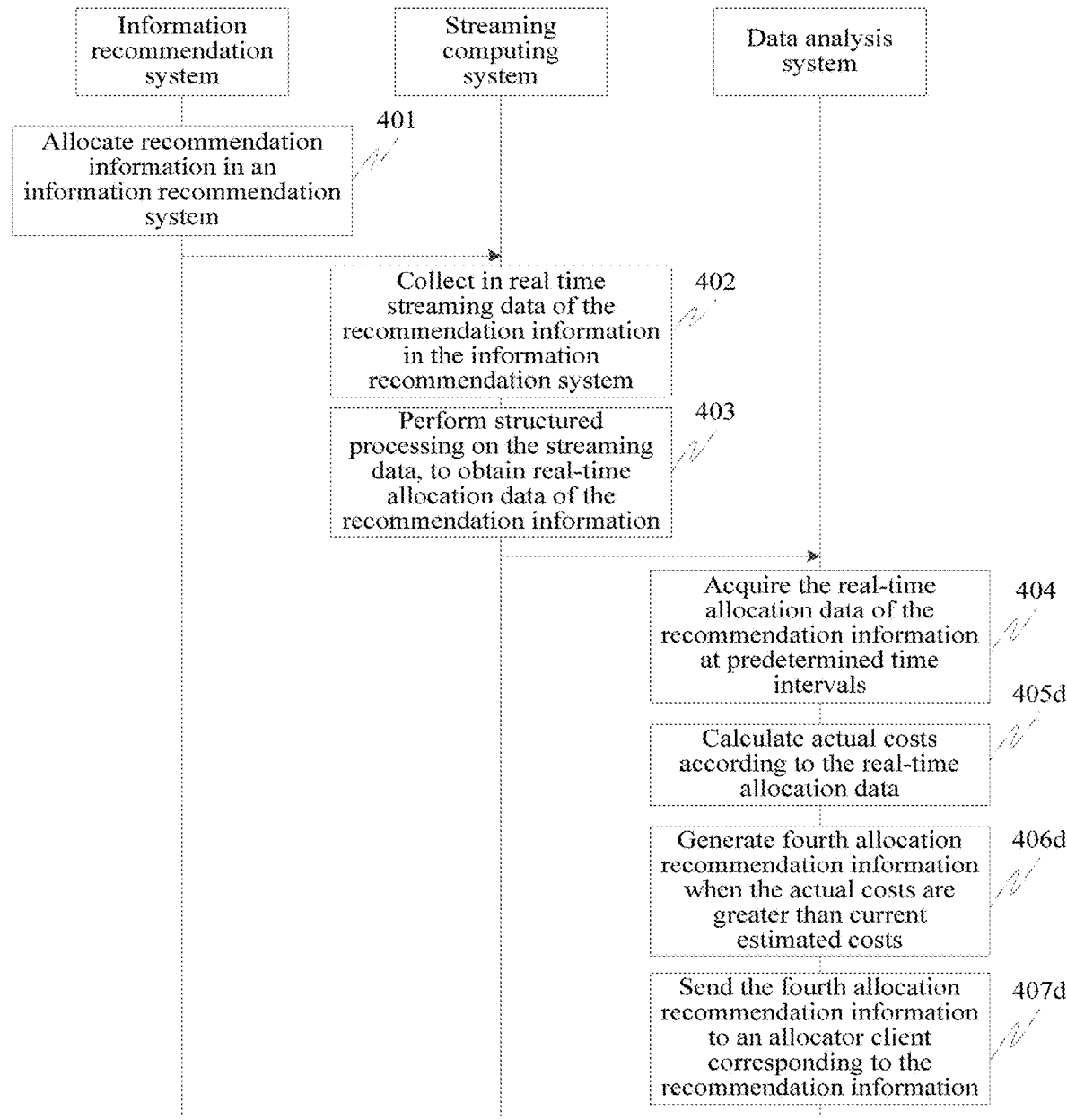
FIG. 4e is a flowchart of an information sending method according to another embodiment of this application.

In another embodiment based on FIG. 4a, when actual effect data is actual costs, and estimated effect data is current estimated costs, step 405 to step 407 are alternatively implemented as step 405d to step 407d, as shown in FIG. 4e:

Step 405d. Calculate actual costs according to the real-time allocation data.

The actual costs of the recommendation information are calculated by using the following formula:

the actual costs=a total expenditure amount within a predetermined time period/conversion data within the predetermined time period The total expenditure amount is an amount of total expenditure of the recommendation information; and the conversion data is the number of pieces of effective behavior data obtained through conversion after the recommendation information is allocated. In other words, the conversion data is the number of conversions from recommendation information allocation to effective behaviors. The effective behavior data includes at least one of adding-to-favorites behavior data, registration behavior data, downloading behavior data, and payment behavior data. The effective behaviors include at least one of adding-to-favorites behaviors, registration behaviors, downloading behaviors, and payment behaviors.

The total expenditure amount within the predetermined time period and the conversion data within the predetermined time period belong to real-time allocation data.

Step 406d. Generate fourth allocation recommendation information when the actual costs are greater than the current estimated costs.

Exemplarily, when the actual costs are greater than the current estimated costs, a landing page of the recommendation information may be poor in quality. The data analysis system generates fourth allocation recommendation information, the fourth allocation recommendation information being used for recommending that the landing page of the recommendation information is modified, and the landing page being a page displayed after the recommendation information is clicked. The landing page is proactively provided by an allocator.

When the actual costs are less than the current estimated costs, the data analysis system continues to perform step 404.

Step 407d. Send the fourth allocation recommendation information to an allocator client corresponding to the recommendation information.

In conclusion, a data analysis system compares, at predetermined time intervals, actual costs with current estimated costs, and generates fourth allocation recommendation information when the actual costs are greater than the current estimated costs, so that an allocator can find as soon as possible that a targeted label of the recommendation information is not accurately set, and adjust the targeted label of the recommendation information in a timely manner, thereby ensuring an allocation effect of the recommendation information.

It should be noted that in the foregoing four optional embodiments based on FIG. 4a, calculation formulas and formula parameters are not fixed. The calculation formulas and formula parameters used by the data analysis system are not limited in the embodiments of this application.

Figure 5:
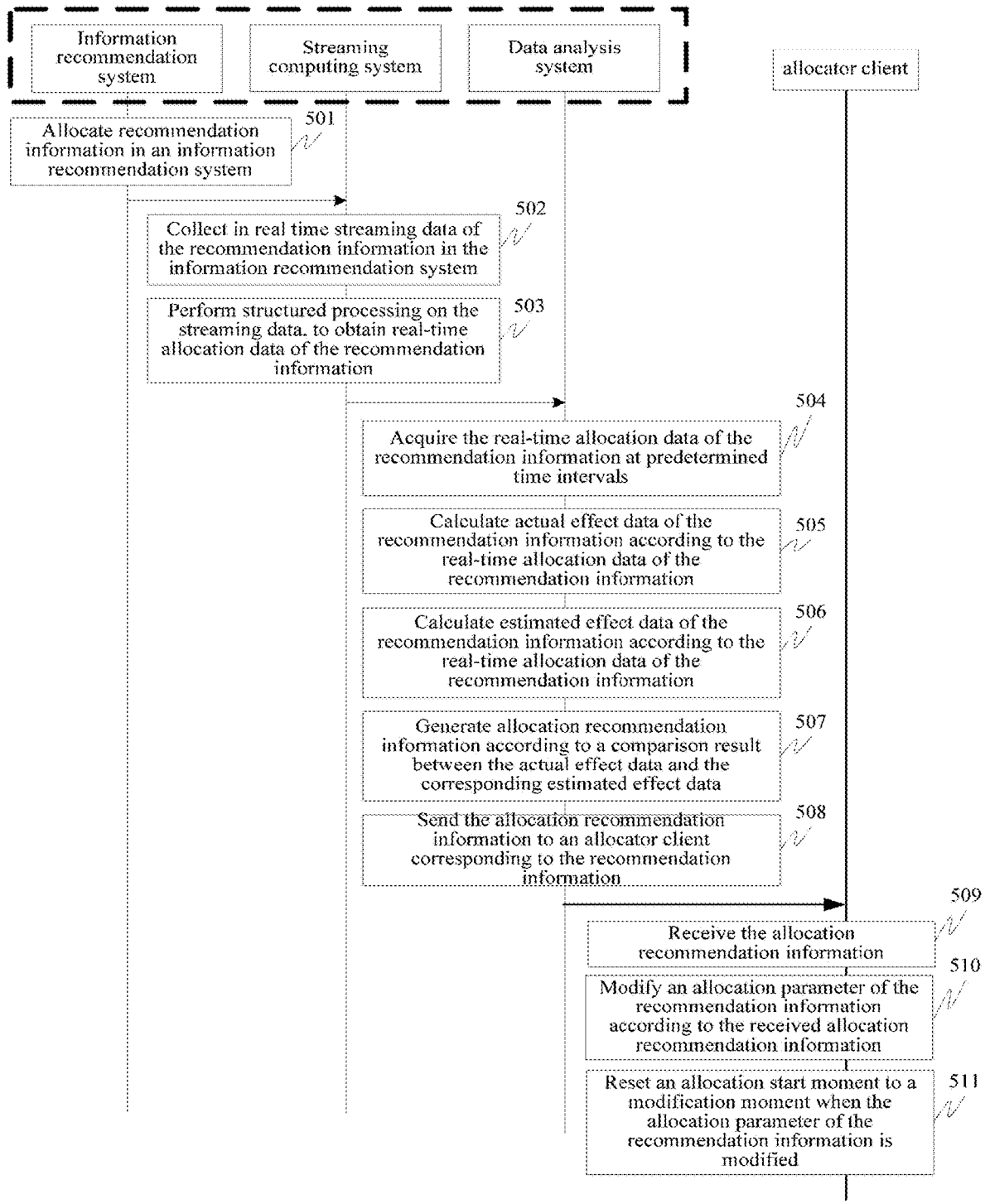
FIG. 5 is a flowchart of an information sending method according to another embodiment of this application.

It should be additionally noted that a person skilled in the art can easily conceive that any two, any three or all of the four embodiments shown in FIG. 4b to FIG. 4e may be implemented jointly. Manners of jointly implementing these embodiments are not described in detail one by one in the embodiments of this application. The manners of jointly implementing all the four embodiments are elaborated by using a specific example only. Details are as follows:

Referring to FIG. 5, FIG. 5 is a flowchart of an information sending method according to another embodiment of this application. This embodiment is described by using an example in which the information sending method is applied to the information recommendation platform shown in FIG. 2. The information sending method includes the following steps:

Step 501. An allocator client allocates recommendation information in an information recommendation system.

Step 502. A streaming computing system collects in real time streaming data of the recommendation information in the information recommendation system.

Step 503. The streaming computing system performs structured processing on the streaming data, to obtain real-time allocation data of the recommendation information.

Step 504. A data analysis system acquires the real-time allocation data of the recommendation information at predetermined time intervals.

Step 505. Calculate actual effect data of the recommendation information according to the real-time allocation data of the recommendation information.

The actual effect data includes at least one of the number of actual searches, the number of actual impressions, an actual click-through rate, and actual costs.

To calculate the actual costs, step 505 may include the following substep: calculating actual costs according to the real-time allocation data; the actual costs being a relationship between conversion data of the recommendation information and a total expenditure amount.

Exemplarily, if a total expenditure amount set by an allocator for the recommendation information within a predetermined time period (for example, one day) is 1000 yuan, 100 target user clients browse the recommendation information within the predetermined time period (one day), and 10 of the target user clients perform effective behavior (payment behavior), conversion data within the predetermined time period (for example, one day) is 10. In other words, conversion data returned by the allocator to the information recommendation system is 10. It can be obtained, according to the set total expenditure amount 1000 yuan and the returned conversion data by using the formula in the embodiment shown in FIG. 4e, that the actual costs are 100 yuan.

Step 506. Calculate estimated effect data of the recommendation information according to the real-time allocation data of the recommendation information.

Estimated effect data corresponding to the number of actual searches is a current estimated number of searches. Estimated effect data corresponding to the number of actual impressions is a current estimated number of impressions.

Estimated effect data corresponding to the actual click-through rate is a current estimated click-through rate. Estimated effect data corresponding to the actual costs is current estimated costs.

To calculate the three pieces of estimated effect data: the current estimated number of searches, the current estimated number of impressions and the current estimated click-through rate, step 506 may include the following substeps:

1. Calculate the current estimated click-through rate according to the real-time allocation data.

The current estimated click-through rate is calculated by using the following formula:

the current estimated click-through rate=min(ctr1, ctr2)

2. Calculate an estimated total number of impressions within a unit time period according to the real-time allocation data.

The estimated total number of impressions within the unit time period is calculated by using the following formulas:

$$\text{the estimated total number of impressions within the unit time period} = \frac{day\_budget}{bid\_price * ctr} * r,$$

and $ctr = \max(ctr1, ctr2)$

3. Calculate the current estimated number of impressions according to the estimated total number of impressions within the unit time period, and an allocation start moment, a current allocation moment and an allocation end moment of the recommendation information.

The current estimated number of impressions is calculated by using the following formula:

$$\text{the current estimated number of impressions} = \frac{\int_{t_{start}}^{t_{curr}} d(t)dt}{\int_{t_{start}}^{t_{end}} d(t)dt} \times \text{an estimated total number of impressions within a unit time period}$$

4. Calculate an estimated total number of searches within the unit time period according to the estimated total number of impressions within the unit time period.

The estimated total number of searches within the unit time period is calculated by using the following formula:

the estimated total number of searches within the unit time period=$a$*an estimated total number of impressions within the unit time period;

5. Calculate the current estimated number of searches according to the estimated total number of searches within the unit time period, and the allocation start moment, the current allocation moment and the allocation end moment of the recommendation information.

The current estimated number of searches is calculated by using the following formula:

$$\text{the current estimated number of searches} = \frac{\int_{t_{start}}^{t_{curr}} c(t)dt}{\int_{t_{start}}^{t_{end}} c(t)dt} \times \text{an estimated total number of searches within a unit time period}$$

Step 507. Generate allocation recommendation information according to a comparison result between the actual effect data and the corresponding estimated effect data.

Figure 6:
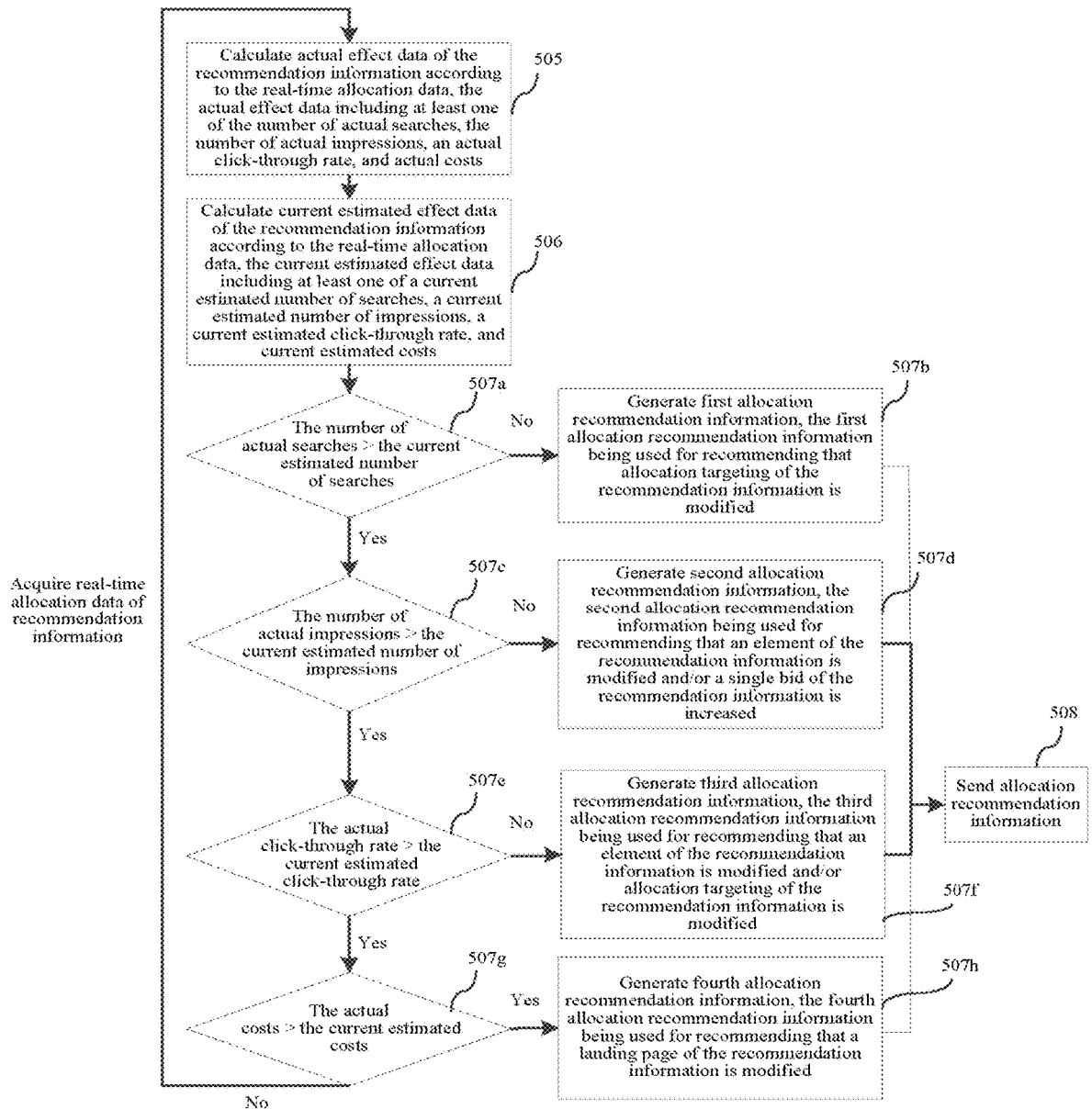
FIG. 6 is a schematic principle diagram of an information sending method according to another embodiment of this application.

After the four pieces of estimated effect data: the current estimated number of searches, the current estimated number of impressions, the current estimated click-through rate and the actual costs are calculated, as shown in FIG. 6, step 507 includes the following substeps:

Step 507*a*. Detect whether the number of actual searches is greater than a current estimated number of searches.

If the number of actual searches is less than the current estimated number of searches, step 507*b* is performed. If the number of actual searches is greater than the current estimated number of searches, step 507*c* is performed.

Step 507*b*. Generate first allocation recommendation information when the number of actual searches is less than the current estimated number of searches.

Exemplarily, the first allocation recommendation information is used for recommending that allocation targeting of the recommendation information is modified.

Step 507*c*. Detect whether the number of actual impressions is greater than a current estimated number of impressions.

If the number of actual impressions is less than the current estimated number of impressions, step 507*d* is performed. If the number of actual impressions is greater than the current estimated number of impressions, step 507*e* is performed.

Step 507*d*. Generate second allocation recommendation information when the number of actual impressions is less than the current estimated number of impressions.

Exemplarily, the second allocation recommendation information is used for recommending that an element of the recommendation information is modified and/or a single bid of the recommendation information is increased.

Step 507*e*. Detect whether an actual click-through rate is greater than a current estimated click-through rate.

If the actual click-through rate is less than the current estimated click-through rate, step 507*f* is performed. If the actual click-through rate is greater than the current estimated click-through rate, step 507*g* is performed.

Step 507*f* Generate third allocation recommendation information when the actual click-through rate is less than the current estimated click-through rate.

Exemplarily, the third allocation recommendation information is used for recommending that an element of the recommendation information is modified and/or allocation targeting of the recommendation information is modified.

Step 507*g*. Detect whether actual costs are greater than current estimated costs.

If the actual costs are greater than the current estimated costs, step 507*h* is performed. If the actual costs are less than the current estimated costs, step 504 is performed.

Step 507*h*. Generate fourth allocation recommendation information when the actual costs are less than the current estimated costs.

Exemplarily, the fourth allocation recommendation information is used for recommending that a landing page of the recommendation information is modified, and the landing page is a page displayed after the recommendation information is clicked.

Step 508. Send the allocation recommendation information to the allocator client corresponding to the recommendation information.

Step 509. The allocator client receives the allocation recommendation information.

Step 510. The allocator client modifies an allocation parameter of the recommendation information according to the received allocation recommendation information, allocation data generated by allocating the recommendation information after the parameter is modified being different from the real-time allocation data obtained in step 503.

Allocation data generated according to the allocation recommendation information is different from the collected real-time allocation data.

The allocation parameter may include at least one of an element of the recommendation information, an expenditure budget for allocating the recommendation information within a unit time period of the recommendation information, a single bid for allocating the recommendation information, and a landing page of the recommendation information.

Step 511. Reset an allocation start moment to a modification moment when the allocation parameter of the recommendation information is modified.

The modification moment is a modification completion moment at which the allocation parameter of the recommendation information is modified.

Figure 7:
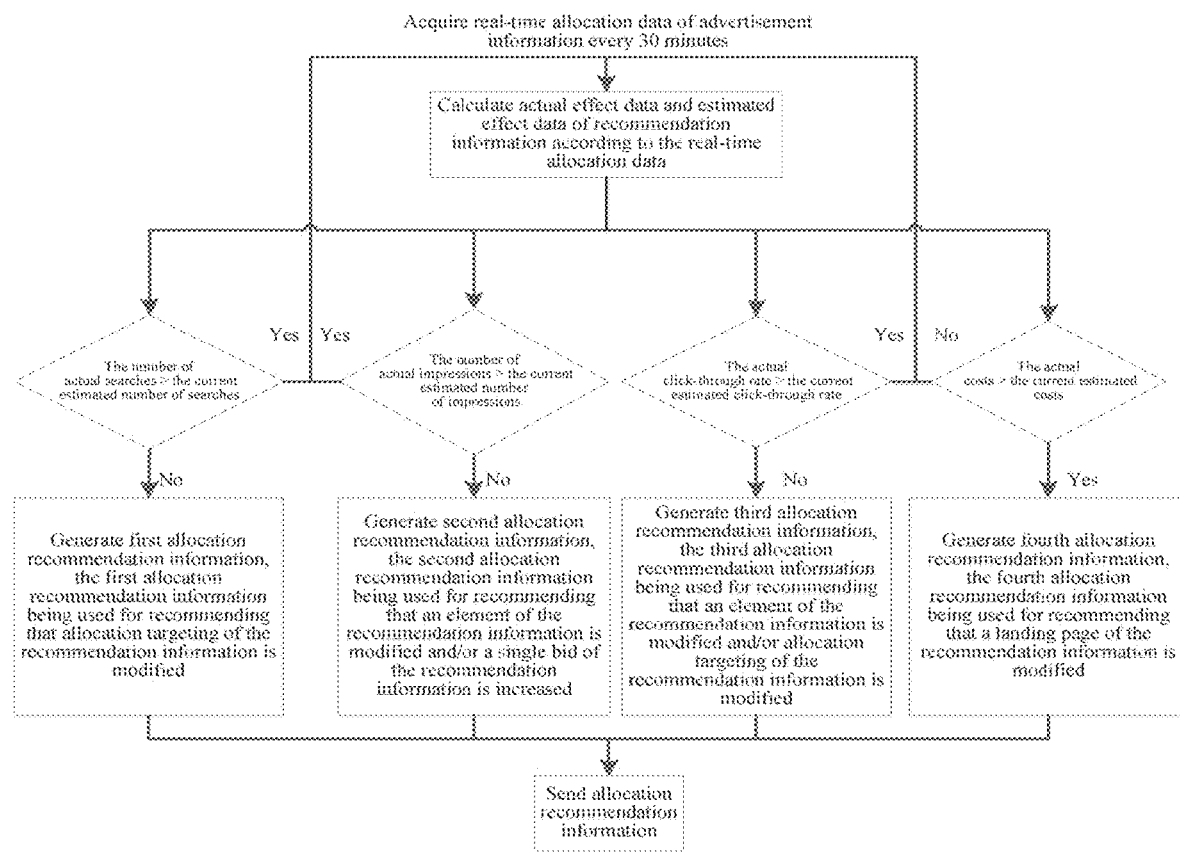
FIG. 7 is another schematic principle diagram of an information sending method according to another embodiment of this application.

FIG. 6 shows the embodiment of determining in series the four indicators: the current estimated number of searches, the current estimated number of impressions, the current estimated click-through rate and the actual costs. In another embodiment, the four indicators may be alternatively determined in parallel, exemplarily, as shown in FIG. 7. Details are not described again in this specification.

In conclusion, corresponding allocation recommendation information is generated according to comparison results between different actual effect data and corresponding estimated effect data. This resolves a problem that allocation recommendation information generated when recommendation information is created cannot adapt to an allocation environment changing in real time. In addition, the corresponding allocation recommendation information is sent to an allocator according to a comparison result between actual effect data and estimated effect data in an advertisement allocation process, so that an allocation effect of the recommendation information is monitored in real time in the allocation process, thereby achieving an effect of making the allocation recommendation information adapt to the allocation environment changing in real time.

Figure 8:
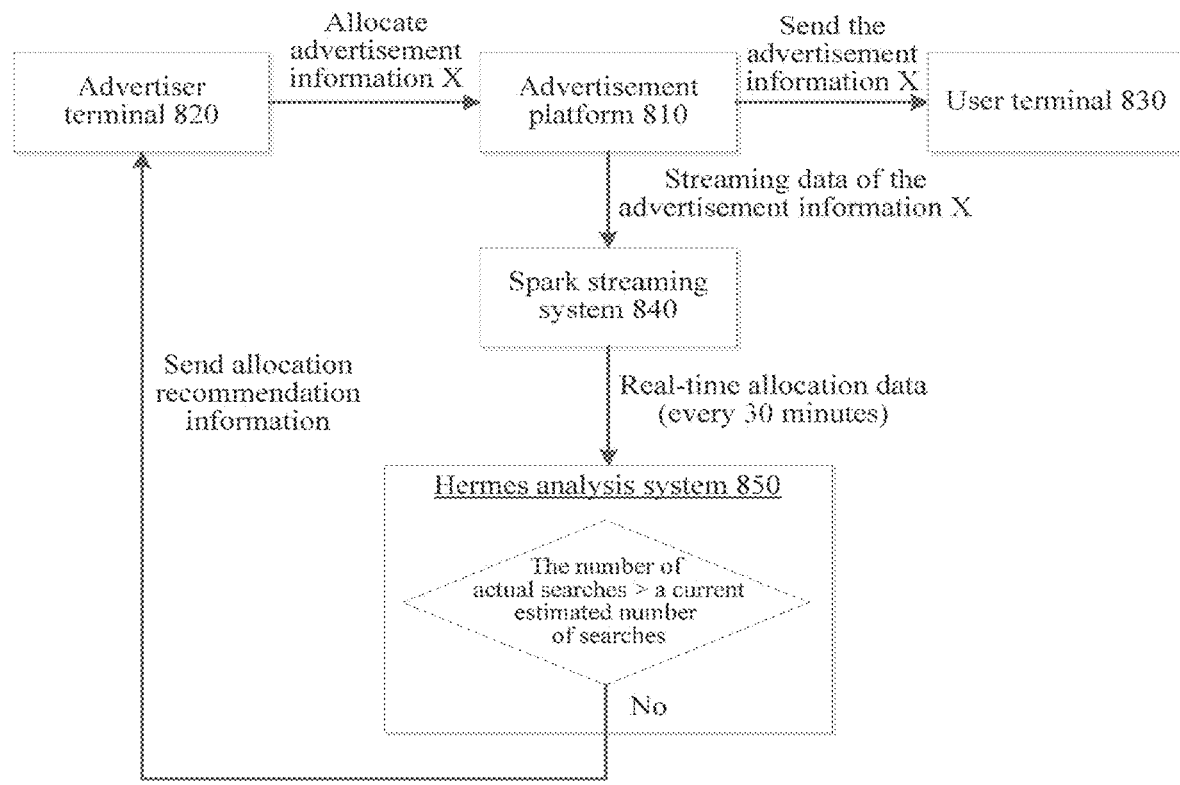
FIG. 8 is a flowchart of an information sending method according to another embodiment of this application.

Referring to FIG. 8, in a specific example, an information recommendation system is an advertisement platform 810, recommendation information is advertisement information, and an allocator terminal is an advertiser terminal 820. In this case, the advertiser terminal 820 sends, to the advertisement platform 810, an allocation request for allocating advertisement information X. The advertisement platform 810 allocates the advertisement information X to a user terminal 830.

The spark streaming system 840 collects in real time streaming data of the advertisement information X in the advertisement platform 810 in an allocation process. The spark streaming system 840 performs structured processing on the streaming data, to obtain real-time allocation data of the advertisement information X.

The Hermes analysis system 850 acquires the real-time allocation data of the advertisement information X every 30 minutes. The Hermes analysis system 850 calculates actual effect data and estimated effect data of the advertisement information X according to the real-time allocation data of the advertisement information, and generates allocation recommendation information according to a comparison result between the actual effect data and the corresponding estimated effect data; and sends the allocation recommendation information to the advertiser terminal 820 corresponding to the advertisement information X.

The advertiser terminal 820 receives the allocation recommendation information. The advertiser terminal 820 determines, according to the received allocation recommendation information, whether to modify an allocation parameter of the advertisement information X. The allocation parameter may include at least one of: an element of the advertisement information, an expenditure budget for allocating the advertisement information X within a unit time period, a single bid for allocating the advertisement information, and a landing page of the advertisement information X. An allocation start moment is reset to a modification moment when the allocation parameter of the advertisement information X is modified. The modification moment is a modification completion moment at which the advertiser terminal 820 modifies the allocation parameter of the advertisement information.

Subsequently, the Hermes analysis system 850 continues to monitor the allocation process of the advertisement information X. In other words, the foregoing process is repeated.

The following is apparatus embodiments of this application. For details that are not elaborated in the apparatus embodiments, refer to the foregoing method embodiments that are in a one-to-one correspondence to the apparatus embodiments.

Figure 9:
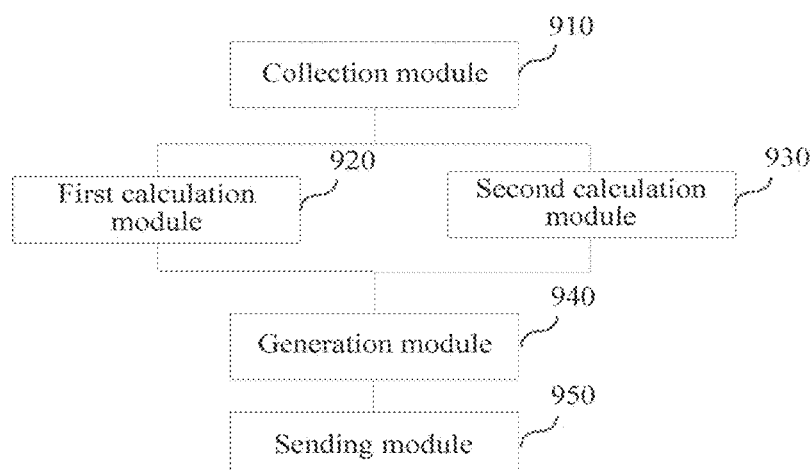
FIG. 9 is a schematic structural diagram of an information sending apparatus according to an embodiment of this application.

Referring to FIG. 9, FIG. 9 is a schematic structural diagram of an information sending apparatus according to an embodiment of this application. The apparatus includes:

one or more memories; and one or more processors;

the one or more memories storing one or more instruction modules, configured to be executed by the one or more processors, and the one or more instruction modules including:

a collection module 910, configured to collect real-time allocation data of recommendation information in an information recommendation system; the information recommendation system being a platform used for allocating the recommendation information to a target user client, and the real-time allocation data including data associated with an allocation process of the recommendation information;

a first calculation module 920, configured to calculate actual effect data of the recommendation information according to the real-time allocation data of the recommendation information; the actual effect data being used for representing an actual allocation effect of the recommendation information in the information recommendation system;

a second calculation module 930, configured to calculate estimated effect data of the recommendation information according to the real-time allocation data of the recommendation information; the estimated effect data being used for representing an estimated allocation effect of the recommendation information in the information recommendation system;

a generation module 940, configured to generate allocation recommendation information according to a comparison result between the actual effect data and the corresponding estimated effect data; and a sending module 950, configured to send the allocation recommendation information to an allocator client corresponding to the recommendation information, allocation data generated according to the allocation recommendation information being different from the collected real-time allocation data.

It may be understood that a function of the collection module may be implemented by the streaming computing system 240 in FIG. 2. However, in this embodiment of this application, the collection module is not limited to the streaming computing system 240, provided that the collection module can collect the real-time allocation data of the recommendation information in the information recommendation system. Any functional module or hardware module capable of implementing this function may be referred to as a collection module.

It may be understood that functions of the first calculation module 920, the second calculation module 930, the generation module 940, and the sending module 950 all may be implemented by the data analysis system 260 in FIG. 2. Certainly, the first calculation module 920, the second calculation module 930, the generation module 940, and the sending module 950 in this embodiment of this application are not limited to being implemented by the data analysis system 260 only.

In conclusion, actual effect data of recommendation information and estimated effect data of the recommendation information are calculated according to real-time allocation data of the recommendation information, and allocation recommendation information is generated according to a comparison result between the actual effect data and the corresponding estimated effect data. This resolves a problem that allocation recommendation information generated when recommendation information is created cannot adapt to an allocation environment changing in real time. In addition, the corresponding allocation recommendation information is sent to an allocator according to a comparison result between actual effect data and estimated effect data in an advertisement allocation process, so that an allocation effect of the recommendation information is monitored in real time in the allocation process, thereby achieving an effect of making the allocation recommendation information adapt to the allocation environment changing in real time.

Figure 10:
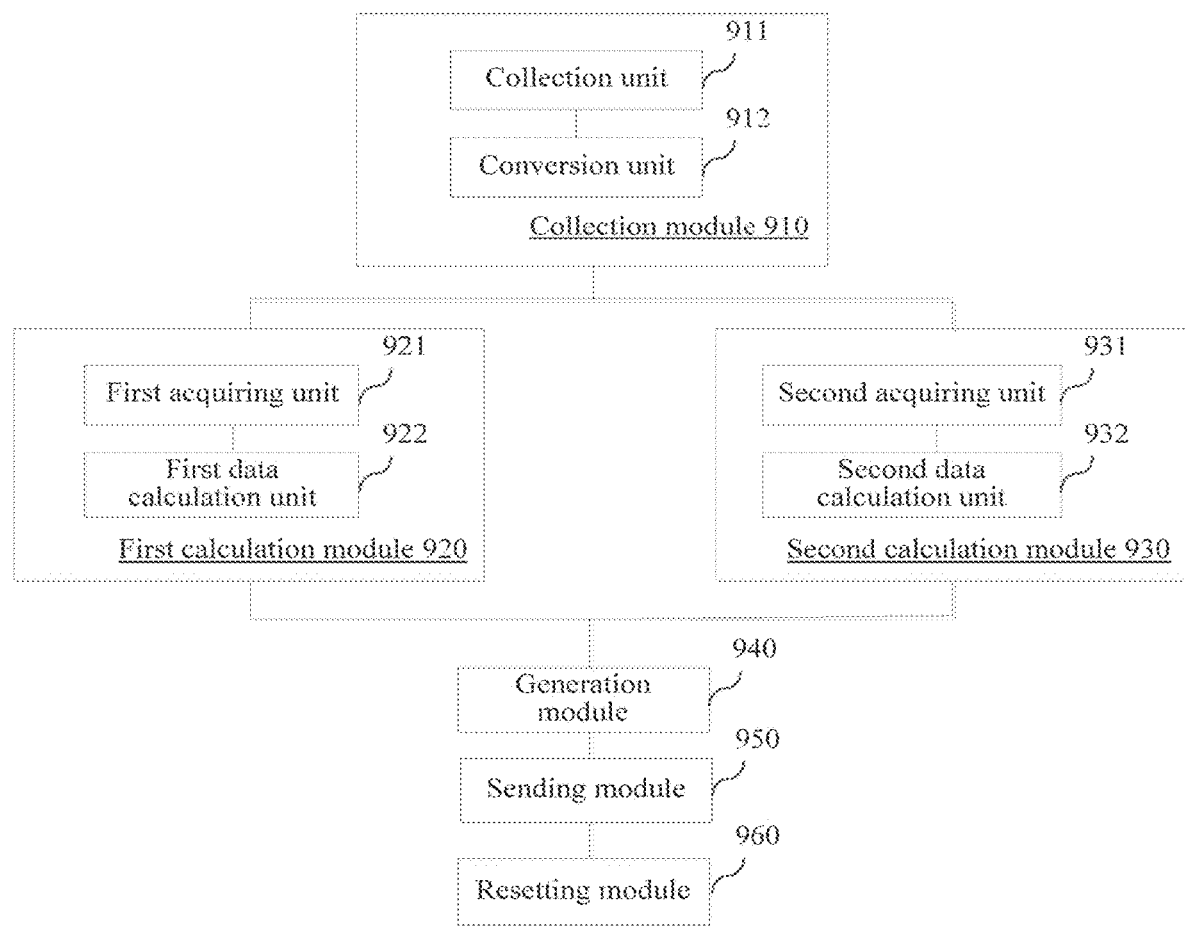
FIG. 10 is a schematic structural diagram of an information sending apparatus according to another embodiment of this application.

Referring to FIG. 10, FIG. 10 is a schematic structural diagram of an information sending apparatus according to another embodiment of this application. This embodiment is an embodiment provided based on the embodiment shown in FIG. 9.

The collection module 910 includes:

a collection unit 911 and a conversion unit 912.

The collection unit 911 is configured to collect in real time streaming data of recommendation information in an information recommendation system by using a streaming computing system.

The conversion unit 912 is configured to perform structured processing on the streaming data by using the streaming computing system, to obtain real-time allocation data of the recommendation information; the structured processing being a processing manner of converting streaming data collected in real time into data with a structured storage form.

The first calculation module 920 includes:

a first acquiring unit 921 and a first data calculation unit 922.

The first acquiring unit 921 is configured to acquire the real-time allocation data of the recommendation information at predetermined time intervals by using a data analysis system.

The first data calculation unit 922 is configured to calculate actual effect data of the recommendation information according to the real-time allocation data by using the data analysis system.

The second calculation module 930 includes:

a second acquiring unit 931 and a second data calculation unit 932.

The second acquiring unit 931 is configured to acquire the real-time allocation data of the recommendation information at predetermined time intervals by using the data analysis system.

The second data calculation unit 932 is configured to calculate estimated effect data of the recommendation information according to the real-time allocation data by using the data analysis system.

The actual effect data includes at least one of the number of actual searches, the number of actual impressions, an actual click-through rate, and actual costs.

Estimated effect data corresponding to the number of actual searches is a current estimated number of searches.

Estimated effect data corresponding to the number of actual impressions is a current estimated number of impressions.

Estimated effect data corresponding to the actual click-through rate is a current estimated click-through rate.

Estimated effect data corresponding to the actual costs is current estimated costs.

The number of actual searches is the number of searches of a key word corresponding to the recommendation information on a search engine of the information recommendation system. The number of actual impressions is the number of impressions of the recommendation information on the target user client. The actual click-through rate is the number of clicks of the recommendation information after exposure on the target user client. The actual costs are a relationship between conversion data of the recommendation information and a total expenditure amount.

A generation module 940 is configured to generate allocation recommendation information according to a comparison result between the actual effect data and the corresponding estimated effect data.

A sending module 950 is configured to send the allocation recommendation information to an allocator client corresponding to the recommendation information.

In conclusion, corresponding allocation recommendation information is generated according to comparison results between different actual effect data and corresponding estimated effect data. This resolves a problem that allocation recommendation information generated when recommendation information is created cannot adapt to an allocation environment changing in real time. In addition, the corresponding allocation recommendation information is sent to an allocator according to a comparison result between actual effect data and estimated effect data in an advertisement allocation process, so that an allocation effect of the recommendation information is monitored in real time in the allocation process, thereby achieving an effect of making the allocation recommendation information adapt to the allocation environment changing in real time.

Figure 11:
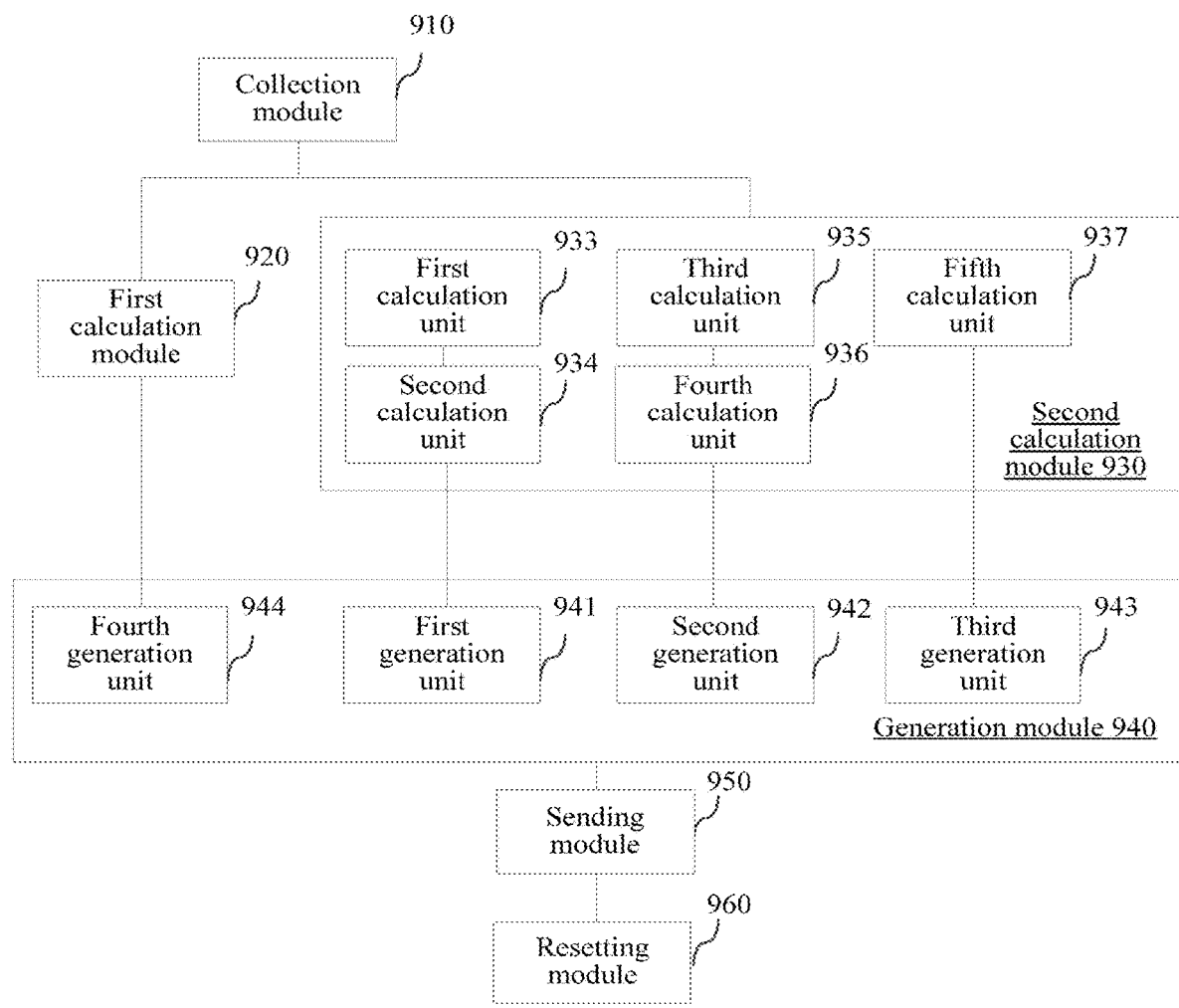
FIG. 11 is a schematic structural diagram of an information sending apparatus according to another embodiment of this application.

Referring to FIG. 11, FIG. 11 is a schematic structural diagram of an information sending apparatus according to another embodiment of this application. This embodiment is an embodiment provided based on the embodiment shown in FIG. 9.

A collection module 910 is configured to collect real-time allocation data of recommendation information in an information recommendation system; the information recommendation system being a platform used for allocating the recommendation information to a target user client, and the real-time allocation data including data associated with an allocation process of the recommendation information.

A first calculation module 920 is configured to calculate actual effect data of the recommendation information according to the real-time allocation data of the recommendation information; the actual effect data being used for representing an actual allocation effect of the recommendation information in the information recommendation system.

When the actual effect data is actual costs, the first calculation module 920 may be configured to calculate the actual costs of the recommendation information by using the following formula:

the actual costs=a total expenditure amount within a predetermined time period/conversion data within the predetermined time period The total expenditure amount is an amount of total expenditure of the recommendation information; and the conversion data is the number of pieces of effective behavior data obtained through conversion after the recommendation information is allocated.

A second calculation module 930 is configured to calculate estimated effect data of the recommendation information according to the real-time allocation data of the recommendation information; the estimated effect data being used for representing an estimated allocation effect of the recommendation information in the information recommendation system.

When the estimated effect data is a current estimated number of searches, the second calculation module 930 may include:
a first calculation unit 933, configured to calculate the current estimated number of searches by using the following formula:

$$\text{the current estimated number of searches} = \frac{\int_{t_{start}}^{t_{curr}} c(t)dt}{\int_{t_{start}}^{t_{end}} c(t)dt} \times \text{an estimated of searches within a unit time period}$$

c(t) is a search opportunity curve, the search opportunity curve is a relationship curve between the number of available searches within the unit time period and moments, and the search opportunity curve is calculated according to historical search data in the information recommendation system; [t_start, t_curr] is an allocation start moment to a current allocation moment of the recommendation information within the unit time period; [t_start, t_end] is the allocation start moment to an allocation end moment of the recommendation information within the unit time period; and the estimated total number of searches within the unit time period is an estimated total number of searches of a key word corresponding to the recommendation information on a search engine of the information recommendation system.

The second calculation module 930 includes:
a second calculation unit 934, configured to calculate the estimated total number of searches within the unit time period by using the following formulas:

the estimated total number of searches within the unit time period=$a$*an estimated total number of impressions within the unit time period;

the estimated total number of impressions within the unit time period =

$$\frac{day\_budget}{bid\_price * ctr} * r,$$

and $ctr = \max(ctr1, ctr2)$ a is an empirical value, and a is greater than or equal to 1; day_budget is an expenditure budget for allocating the recommendation information within the unit time period; bid_price is a single bid for allocating the recommendation information; ctr1 is a historical average click-through rate of the recommendation information in an industry of the recommendation information; ctr2 is an average click-through rate of the recommendation information in a targeted demographic; r is an adjustment value, and r is greater than 1; and the estimated total number of impressions within the unit time period is an estimated total number of impressions of the recommendation information on the target user client. a and r are preset constants, and do not need to be greater than 1.

When the estimated effect data is a current estimated number of impressions, the second calculation module 930 includes:
a third calculation unit 935, configured to calculate the current estimated number of impressions by using the following formula:

$$\text{the current estimated number of impressions} = \frac{\int_{t_{start}}^{t_{curr}} d(t)dt}{\int_{t_{start}}^{t_{end}} d(t)dt} \times \text{an}$$

estimated total number of impressions within a unit time period d(t) is an impression opportunity curve, the impression opportunity curve is a relationship curve between the number of impressions within the unit time period and moments, and the impression opportunity curve is calculated according to historical impression data in the information recommendation system; [t_start, t_curr] is an allocation start moment to a current allocation moment of the recommendation information within the unit time period; [t_start, t_end] is the allocation start moment to an allocation end moment of the recommendation information within the unit time period; and the estimated total number of impressions within the unit time period is an estimated total number of impressions of the recommendation information on the target user client.

The second calculation module 930 includes:
a fourth calculation unit 936, configured to calculate the estimated total number of impressions within the unit time period by using the following formulas:

the estimated total number of impressions within the unit time period =

$$\frac{day\_budget}{bid\_price * ctr} * r,$$

and $ctr = \max(ctr1, ctr2)$ day_budget is an expenditure budget for allocating the recommendation information within the unit time period; bid_price is a single bid for allocating the recommendation information; and ctr1 is a historical average click-through rate of the recommendation information in an industry of the recommendation information, ctr2 is an average click-through rate of the recommendation information in a targeted demographic, r is an adjustment value, and r is greater than 1.

When the estimated effect data is a current estimated click-through rate, the second calculation module 930 includes:
a fifth calculation unit 937, configured to calculate the current estimated click-through rate by using the following formula:

the current estimated click-through rate=min(ctr1, ctr2)

ctr1 is a historical average click-through rate of the recommendation information in an industry of the recommendation information, and ctr2 is an average click-through rate of the recommendation information in a targeted demographic.

A generation module 940 is configured to generate allocation recommendation information according to a comparison result between the actual effect data and the corresponding estimated effect data.

The generation module 940 includes: a first generation unit 941 and/or a second generation unit 942 and/or a third generation unit 943 and/or a fourth generation unit 944. In other words, the generation module includes at least one of a first generation unit, a second generation unit, a third generation unit, and a fourth generation unit.

The first generation unit 941 is configured to generate first allocation recommendation information when the number of actual searches is less than the current estimated number of searches, the first allocation recommendation information being used for recommending that allocation targeting of the recommendation information is modified.

The second generation unit 942 is configured to generate second allocation recommendation information when the number of actual impressions is less than the current estimated number of impressions, the second allocation recommendation information being used for recommending that an element of the recommendation information is modified and/or a single bid of the recommendation information is increased.

The third generation unit 943 is configured to generate third allocation recommendation information when the actual click-through rate is less than the current estimated click-through rate, the third allocation recommendation information being used for recommending that an element of the recommendation information is modified and/or allocation targeting of the recommendation information is modified.

The fourth generation unit 944 is configured to generate fourth allocation recommendation information when the actual costs are greater than the current estimated costs, the fourth allocation recommendation information being used for recommending that a landing page of the recommendation information is modified, and the landing page being a page displayed after the recommendation information is clicked.

A sending module 950 is configured to send the allocation recommendation information to an allocator client corresponding to the recommendation information.

The apparatus further includes:
a resetting module 960, configured to reset the allocation start moment to a modification moment when the expenditure budget for allocating the recommendation information within the unit time period or the single bid for allocating the recommendation information is modified.

In conclusion, corresponding allocation recommendation information is generated according to comparison results between different actual effect data and corresponding estimated effect data. This resolves a problem that allocation recommendation information generated when recommendation information is created cannot adapt to an allocation environment changing in real time. In addition, the corresponding allocation recommendation information is sent to an allocator according to a comparison result between actual effect data and estimated effect data in an advertisement allocation process, so that an allocation effect of the recommendation information is monitored in real time in the allocation process, thereby achieving an effect of making the allocation recommendation information adapt to the allocation environment changing in real time.

An embodiment of this application further provides a non-volatile computer-readable storage medium, storing a computer-readable instruction, being capable of causing at least one processor to perform the method described above.

Figure 12:
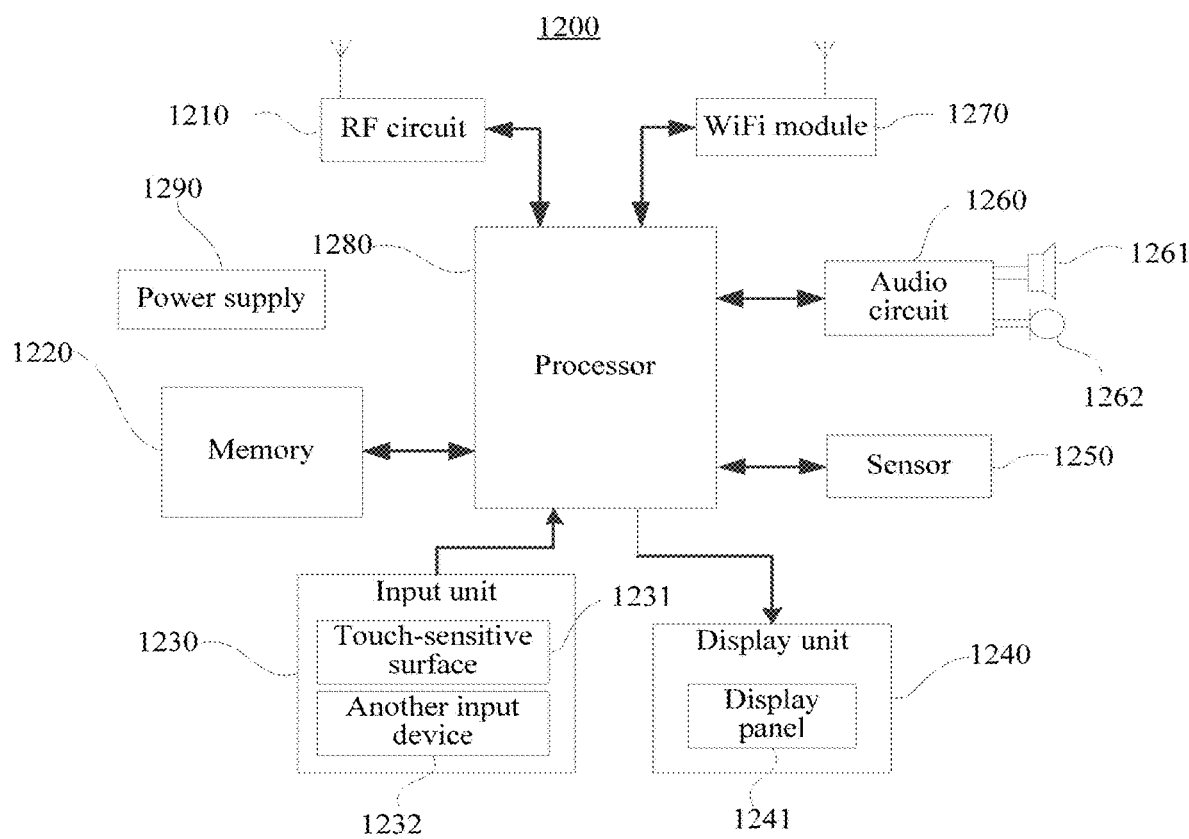
FIG. 12 is a structural block diagram of a terminal according to an embodiment of this application.

Referring to FIG. 12, FIG. 12 is a block diagram of a device 1200 according to an embodiment of this application. An allocator client or a user client terminal may run on the terminal. Specifically, the device 1200 may include components such as a radio frequency (RF) circuit 1210, a memory 1220 including one or more computer-readable storage media, an input unit 1230, a display unit 1240, a sensor 1250, an audio circuit 1260, a Wireless Fidelity (WiFi) module 1270, processing circuitry such as a processor 1280 including one or more processing cores, and a power supply 1290. A person skilled in the art may understand that the structure of the device shown in FIG. 12 does not constitute a limitation to the device, and the device may include more or fewer components than those shown in the figure, or some components may be combined, or a different component deployment may be used.

The RF circuit 1210 may be configured to receive and send signals during information receiving and sending or during a call. Particularly, the RF circuit 1280 receives downlink information from a base station, then delivers the downlink information to one or more processors 1280 for processing, and sends related uplink data to the base station. Generally, the RF circuit 1210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1210 may also communicate with a network and another device by means of wireless communication. The wireless communication may use any communication standard or protocol, which includes, but is not limited to, a Global System for Mobile communications (GSM), a general packet radio service (GPRS), Code Division Multiple Access (CDMA), Wideband Code Division Multiple Access (WCDMA), Long Term Evolution (LTE), an email, Short Messaging Service (SMS), and the like. The memory 1220 may be configured to store a software program and module. The processor 1280 runs the software program and module stored in the memory 1220, to implement various functional applications and data processing. The memory 1220 may mainly include a program storage area and a data storage area. The program storage area may store an operating system, an application program required by at least one function (such as a sound playback function and an image display function), and the like. The data storage area may store data (such as audio data and an address book) created according to use of the device 1200, and the like. In addition, the memory 1220 may include a high speed random access memory (RAM), and may further include a non-volatile memory, such as at least one magnetic disk storage device, a flash memory, or other volatile solid-state storage devices. Correspondingly, the memory 1220 may further include a memory controller, to provide access of the processor 1280 and the input unit 1230 to the memory 1220.

The input unit 1230 may be configured to receive input digit or character information, and generate a keyboard, mouse, joystick, optical or track ball signal input related to the user setting and function control. Specifically, the input unit 1230 may include a touch-sensitive surface 1231 and another input device 1232. The touch-sensitive surface

1231, also referred to as a touchscreen or a touch panel, may collect a touch operation of a user on or near the touch-sensitive surface (such as an operation of a user on or near the touch-sensitive surface 1231 by using any suitable object or accessory, such as a finger or a stylus), and drive a corresponding connection apparatus according to a preset program. The touch-sensitive surface 1231 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1280. Moreover, the touch controller can receive and execute a command sent from the processor 1280. In addition, the touch-sensitive surface 1231 may be a resistive, capacitive, infrared, or surface sound wave type touch-sensitive surface. In addition to the touch-sensitive surface 1231, the input unit 1230 may further include the another input device 1232. Specifically, the another input device 1232 may include, but is not limited to: one or more of a physical keyboard, a functional key (such as a volume control key or a switch key), a track ball, a mouse, and a joystick.

The display unit 1240 may be configured to display information input by the user or information provided for the user and various graphic user interfaces of the device 120. The graphic user interfaces may include a figure, text, an icon, a video, and any combination thereof. The display unit 1240 may include a display panel 1241. Optionally, the display panel 1241 may be configured by using a liquid crystal display (LCD), an organic light-emitting diode (OLED), or the like. Further, the touch-sensitive surface 1231 may cover the display panel 1241. After detecting a touch operation on or near the touch-sensitive surface 1231, the touch-sensitive surface 1231 transfers the touch operation to the processor 1280, to determine a type of a touch event. Then, the processor 1280 provides corresponding visual output on the display panel 1241 according to the type of the touch event. Although, in FIG. 12, the touch-sensitive surface 1231 and the display panel 1241 are used as two separate parts to implement input and output functions, in some embodiments, the touch-sensitive surface 1231 and the display panel 1241 may be integrated to implement the input and output functions.

The device 1200 may further include at least one sensor 1250, such as an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the device 1200 is moved to the ear. As one type of motion sensor, a gravity acceleration sensor may detect magnitude of accelerations in various directions (generally on three axes), may detect magnitude and a direction of the gravity when static, and may be applied to an application for recognizing the attitude of the mobile phone (for example, switching between landscape orientation and portrait orientation, a related game, and magnetometer attitude calibration), a function related to vibration recognition (such as a pedometer and a knock), or a like. Other sensors, such as a gyroscope, a barometer, a hygrometer, a thermometer, and an infrared sensor may be configured on the device 1200. Details are not described herein.

The audio circuit 1260, a speaker 1221, and a microphone 1222 may provide audio interfaces between the user and the device 1200. The audio circuit 1260 may transmit, to the speaker 1221, a received electric signal converted from received audio data. The speaker 1221 converts the electric signal into a sound signal for output. On the other hand, the microphone 1222 converts a collected sound signal into an electric signal. The audio circuit 1260 receives the electric signal and converts the electric signal into audio data, and outputs the audio data to the processor 1280 for processing. Then, the processor 1180 sends the audio data to another device by using the RF circuit 1210, or outputs the audio data to the memory 1220 for further processing. The audio circuit 1260 may further include an earplug jack, to provide communication between a peripheral earphone and the device 1200.

WiFi belongs to a short distance wireless transmission technology. The device 1200 may help, by using the WiFi unit 1270, a user to receive and send an email, browse a web page, and access streaming media, and the like, which provides wireless broadband Internet access for the user. Although the WiFi module 1270 is shown in FIG. 12, it may be understood that the WiFi module 1270 is not a necessary component of the device 1200. When required, the WiFi module 1270 may be omitted as long as the scope of the essence of the present disclosure is not changed.

The processor 1280 is a control center of the device 1200, and is connected to all parts of the entire device by using various interfaces and lines. By running or executing the software program and/or the module stored in the memory 1220, and invoking data stored in the memory 1220, the processor 1280 performs various functions and data processing of the device 1200, thereby performing overall monitoring on the device. The processor 1280 may include the one or more processing cores. The processor 1280 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1280.

The device 1200 further includes the power supply 1290 (such as a battery) for supplying power to the components. Preferably, the power supply may be logically connected to the processor 1280 by using a power management system, thereby implementing, by using the power management system, functions such as charging, discharging, and power consumption management. The power supply 1290 may further include one or more of a direct current or alternating current power supply, a recharging system, a power failure detection circuit, a power supply converter or inverter, a power supply state indicator, and any other components.

Although not shown in the figure, the device 1200 may further include a camera, a Bluetooth module, and the like. Details are not described herein.

The device 1200 further includes a memory and one or more programs. The one or more programs are stored in the memory, and when executed by one or more processors, enable the apparatus 1200 to perform the foregoing information sending method performed by the terminal.

Figure 13:
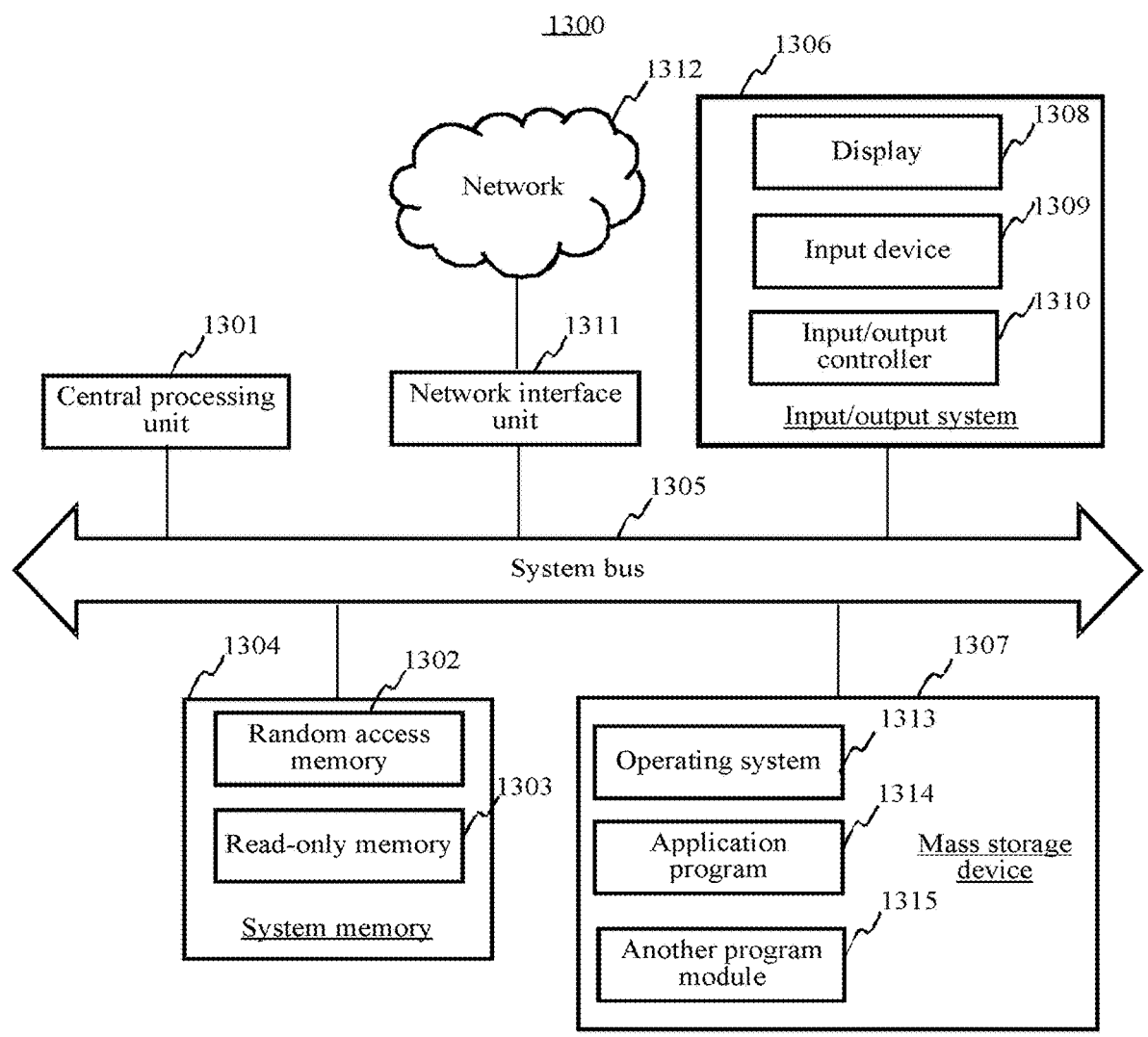
FIG. 13 is a schematic block diagram of a server according to an embodiment of this application.

Referring to FIG. 13, FIG. 13 is a structural architectural diagram of a server according to an embodiment of this application. The device may be a server in a backend server cluster 140. Specifically, the server 1300 includes processing circuitry such as a central processing unit (CPU) 1301, a system memory 1304 including a RAM 1302 and a readonly memory (ROM) 1303, and a system bus 1305 connecting the system memory 1304 and the CPU 1301. The server 1300 further includes a basic input/output system (I/O system) 1306 for transmitting information between components in a computer, and a mass storage device 1307 configured to store an operating system 1313, an application program 1314, and another program module 1315.

The basic I/O system 1306 includes a display 1308 configured to display information, and an input device 1309 used by a user to input information, such as a mouse or a keyboard. The display 1308 and the input device 1309 are both connected to the CPU 1301 by using an input/output controller 1310 connected to the system bus 1305. The basic I/O system 1306 may further include the input/output controller 1310, to receive and process input from multiple other devices, such as the keyboard, the mouse, or an electronic stylus. Similarly, the input/output controller 1310 further provides an output to a display screen, a printer or another type of output device.

The mass storage device 1307 is connected to the CPU 1301 by using a mass storage controller (not shown) connected to the system bus 1305. The mass storage device 1307 and an associated computer-readable medium provide non-volatile storage for the server 1300. That is, the mass storage device 1307 may include a computer-readable medium (not shown) such as a hard disk or a CD-ROM.

In general, the computer-readable medium may include a computer storage medium and a communications medium. The computer storage medium includes non-transitory media, such as volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person skilled in the art may know that the computer storage medium is not limited to the foregoing types. The system memory 1304 and the mass storage device 1307 may be collectively referred to as a memory.

According to the embodiments of this application, the server 1300 may further be connected, through a network such as the Internet, to a remote computer on the network. That is, the server 1300 may be connected to a network 1312 by using a network interface unit 1311 connected to the system bus 1305, or may be connected to another type of network or remote computer system (not shown) by using the network interface unit 1311.

The memory further includes one or more programs. The one or more programs are stored in the memory. The one or more programs include instructions used for performing the steps, performed by the server cluster, in the information sending method provided by the embodiments of this application.

The sequence numbers of the embodiments of this application are merely for description purpose but do not indicate the preference of the embodiments.

A person of ordinary skill in the art may understand that all or some of the steps in the information sending method of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of this application, but are not intended to limit this application. Any modification, equivalent reallocation, or improvement made within the spirit and principle of this application shall fall within the protection scope of this application.

What is claimed is:

1. A method of distributing information from an allocator terminal to a client terminal over a communication network, comprising:

receiving, by processing circuitry, information allocation data from an information allocation system, the information allocation system being configured to allocate the information from the allocator terminal to the client terminal over the communication network, the information allocation data including data associated with a process of allocating the information;

generating, by the processing circuitry, first data according to the information allocation data, the first data indicating an actual allocation effect of the information;

generating, by the processing circuitry, second data according to the information allocation data, the second data indicating an estimated allocation effect of the information, the generating the second data including generating a current estimated click-through rate according to the following formula:

the current estimated click-through rate=min(ctr1, ctr2), wherein ctr1 is a historical average click-through rate of the information in an information allocation industry, and ctr2 is an average click-through rate of the information in a targeted demographic;

generating, by the processing circuitry, an allocation instruction according to a comparison between the first data and the corresponding second data; and transmitting, by the processing circuitry, the allocation instruction to cause the allocator terminal to modify the process of allocating the information.

2. The method according to claim 1, wherein the receiving the information allocation data from the information allocation system comprises:

receiving in real time streaming data of the information from the information allocation system; and performing structured processing on the streaming data, to generate the information allocation data.

3. The method according to claim 1, further comprising:
acquiring the information allocation data at predetermined time intervals.

4. The method according to claim 1, wherein
the first data includes an actual click-through rate corresponding to the current estimated click-through rate,
the first data further includes at least one of a number of actual searches, a number of actual impressions, or an actual cost, and
the second data further includes at least one of
a current estimated number of searches corresponding to the number of actual searches;
a current estimated number of impressions corresponding to the number of actual impressions; or
a current estimated coast corresponding to the actual cost.

5. The method according to claim 4, wherein the generating the second data comprises:
generating the current estimated number of searches according to the following formula:

$$\text{the current estimated number of searches} = \frac{\int_{t_{start}}^{t_{curr}} c(t)dt}{\int_{t_{start}}^{t_{end}} c(t)dt} \times \text{an}$$

estimated total number of searches within a unit time period, searches within a unit time period, wherein c(t) is a search opportunity curve, [t_start, t_curr] is an allocation start moment to a current allocation moment of the information within the unit time period, [t_start, t_end] is the allocation start moment to an allocation end moment of the information within the unit time period, and the estimated total number of searches within the unit time period is an estimated total number of searches of a key word corresponding to the information on a search engine of the information allocation system within the unit time period.

6. The method according to claim 5, wherein the generating the second data comprises:

generating the estimated total number of searches within the unit time period according to the following formulas:

the estimated total number of searches within the unit time period = a ∗ an estimated total number of impressions within the unit time period, the estimated total number of impressions within the unit time period =

$$\frac{\text{day\_budget}}{\text{bid\_price} * ctr} * r,$$

and $ctr = \max(ctr1, ctr2)$ wherein day_budget is an expenditure budget for allocating the information within the unit time period, bid_price is a single bid for allocating the information, ctr1 is the historical average click-through rate of the information in the information allocation industry, ctr2 is the average click-through rate of the information in the targeted demographic, the estimated total number of impressions within the unit time period is an estimated total number of impressions of the information on the client terminal within the unit time period, and a and r are preset constants.

7. The method according to claim 6, wherein the method further comprises:

resetting the allocation start moment to a modification moment when the expenditure budget for allocating the information within the unit time period or the single bid is modified.

8. The method according to claim 4, wherein the generating the second data comprises:

generating the current estimated number of impressions according to the following formula:

$$\text{the current estimated number of impressions} = \frac{\int_{t_{start}}^{t_{curr}} d(t)dt}{\int_{t_{start}}^{t_{end}} d(t)dt} \times \text{an}$$

estimated total number of impressions within a unit time period, wherein d(t) is an impression opportunity curve, [t_start, t_curr] is an allocation start moment to a current allocation moment of the information within the unit time period, [t_start, t_end] is the allocation start moment to an allocation end moment of the information within the unit time period, and the estimated total number of impressions within the unit time period is an estimated total number of impressions of the information on the client terminal within the unit time period.

9. The method according to claim 8, wherein the generating the second data comprises:

generating the estimated total number of impressions within the unit time period according to the following formulas:

the estimated total number of impressions within the unit time period =

$$\frac{\text{day\_budget}}{\text{bid\_price} * ctr} * r,$$

and $ctr = \max(ctr1, ctr2)$ wherein day_budget is an expenditure budget for allocating the information within the unit time period, bid_price is a single bid for allocating the information, ctr1 is the historical average click-through rate of the information in the information allocation industry, ctr2 is the average click-through rate of the information in the targeted demographic, and r is a preset constant.

10. The method according to claim 4, wherein the generating the first data comprises:

generating the actual cost of the information according to the following formula:

the actual cost=a total expenditure amount within a predetermined time period/ conversion data within the predetermined time period, wherein the total expenditure amount is an amount of total expenditure of the information, and the conversion data is a number of conversions from an information allocation to effective behaviors after the information is allocated.

11. The method according to claim 4, wherein the generating the allocation instruction comprises one of:

generating a first allocation instruction when the number of actual searches is less than the current estimated number of searches, the first allocation instruction including modifying allocation targeting of the information;

generating a second allocation instruction when the number of actual impressions is less than the current estimated number of impressions, the second allocation instruction including at least one of modifying an element of the information or increasing a single bid of the information;

generating a third allocation instruction when the actual click-through rate is less than the current estimated click-through rate, the third allocation instruction including at least one of modifying an element of the information or allocation targeting of the information; and/or generating a fourth allocation instruction when the actual cost are greater than the current estimated costs, the fourth allocation instruction including modifying a landing page of the information.

12. An apparatus for distributing information from an allocator terminal to a client terminal over a communication network, comprising processing circuitry configured to:

receive information allocation data from an information allocation system, the information allocation system being configured to allocate the information from the allocator terminal to the client terminal, the information allocation data including data associated with a process of allocating the information;

generate first data according to the information allocation data, the first data indicating an actual allocation effect;

generate second data according to the information allocation data, the second data indicating an estimated allocation effect of the information, the second data including a current estimated click-through rate that is generated according to the following formula:

the current estimated click-through rate=min(ctr1, ctr2), wherein ctr1 is a historical average click-through rate of the information in an information allocation industry, and ctr2 is an average click-through rate of the information in a targeted demographic;

generate an allocation instruction according to a comparison between the first data and the corresponding second data; and transmit the allocation instruction to cause the allocator terminal to modify the process of allocating the information.

13. The apparatus according to claim 12, wherein the processing circuitry is further configured to:

collect in real time streaming data of the information in the information allocation system; and perform structured processing on the streaming data, to generate the information allocation data.

14. The apparatus according to claim 12, wherein the processing circuitry is further configured to:

acquire the information allocation data at predetermined time intervals.

15. The apparatus according to claim 12, wherein the first data includes an actual click-through rate corresponding to the current estimated click-through rate, the first data further includes at least one of a number of actual searches, a number of actual impressions, or an actual cost, and the second data further includes at least one of a current estimated number of searches corresponding to the number of actual searches;

a current estimated number of impressions corresponding to the number of actual impressions; or a current estimated costscost corresponding to the actual costscost.

16. The apparatus according to claim 15, wherein the processing circuitry is further configured to:

generate the current estimated number of searches according to the following formula:

$$\text{the current estimated number of searches} = \frac{\int_{t_{start}}^{t_{curr}} c(t)dt}{\int_{t_{start}}^{t_{end}} c(t)dt} \times \text{an}$$

estimated total number of searches within a unit time period, wherein c(t) is a search opportunity curve, [t_start, t_curr] is an allocation start moment to a current allocation moment of the information within the unit time period, [t_start, t_end] is the allocation start moment to an allocation end moment of the information within the unit time period, and the estimated total number of searches within the unit time period is an estimated total number of searches of a key word corresponding to the information on a search engine of the information allocation system within the unit time period.

17. The apparatus according to claim 16, wherein the processing circuitry is further configured to:

generate the estimated total number of searches within the unit time period according to the following formulas:

the estimated total number of searches within the unit time period = a ∗ an estimated total number of impressions within the unit time period, the estimated total number of impressions within the unit time period =

$$\frac{\text{day\_budget}}{\text{bid\_price} * ctr} * r,$$

and $ctr = \max(ctr1, ctr2)$ wherein day_budget is an expenditure budget for allocating the information within the unit time period, bid_price is a single bid for allocating the information, ctr1 is the historical average click-through rate of the information in the information allocation industry, ctr2 is the average click-through rate of the information in the targeted demographic, the estimated total number of impressions within the unit time period is an estimated total number of impressions of the information on the client terminal within the unit time period, and a and r are preset constants.

18. The according to claim 15, wherein the processing circuitry is further configured to:

generate the current estimated number of impressions according to the following formula:

$$\text{the current estimated number of impressions} = \frac{\int_{t_{start}}^{t_{curr}} d(t)dt}{\int_{t_{start}}^{t_{end}} d(t)dt} \times \text{an}$$

estimated total number of impressions within a unit time period, wherein d(t) is an impression opportunity curve, [t_start, t_curr] is an allocation start moment to a current allocation moment of the information within the unit time period, [t_start, t_end] is the allocation start moment to an allocation end moment of the information within the unit time period, and the estimated total number of impressions within the unit time period is an estimated total number of impressions of the information on the client terminal within the unit time period.

19. A non-transitory computer-readable medium storing a program executable by a processor to perform a method of distributing information from an allocator terminal to a client terminal over a communication network, the method comprising:

receiving information allocation data from an information allocation system, the information allocation system being configured to allocate the information from the allocator terminal to the client terminal over the communication network, the information allocation data including data associated with a process of allocating the information;

generating first data of the information according to the information allocation data, the first data indicating an actual allocation effect of the information;

generating second data according to the information allocation data, the second data indicating an estimated allocation effect of the information, the generating the second data including generating a current estimated click-through rate according to the following formula:

the current estimated click-through rate=min(ctr1, ctr2), wherein ctr1 is a historical average click-through rate of the information in an information allocation industry, and ctr2 is an average click-through rate of the information in a targeted demographic;

generating an allocation instruction according to a comparison between the first data and the corresponding second data; and transmitting the allocation instruction to cause the allocator terminal to modify the process of allocating the information.

\* \* \* \* \*